US012587714B2

(12) United States Patent
Couleaud et al.

(10) Patent No.: US 12,587,714 B2
(45) Date of Patent: Mar. 24, 2026

(54) METHODS AND SYSTEMS TO AUTOMATE SUBTITLE DISPLAY BASED ON USER LANGUAGE PROFILE AND PREFERENCES

(71) Applicant: Adeia Guides Inc., San Jose, CA (US)

(72) Inventors: Jean-Yves Couleaud, Mission Viejo, CA (US); Reda Harb, Issaquah, WA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/208,147

(22) Filed: Jun. 9, 2023

(65) Prior Publication Data

US 2024/0414409 A1      Dec. 12, 2024

(51) Int. Cl.
| | |
|---|---|
| *H04N 21/439* | (2011.01) |
| *G10L 13/02* | (2013.01) |
| *G10L 15/00* | (2013.01) |
| *G10L 21/10* | (2013.01) |
| *H04N 21/475* | (2011.01) |
| *H04N 21/485* | (2011.01) |
| *H04N 21/488* | (2011.01) |

(52) U.S. Cl.
CPC ......... *H04N 21/4884* (2013.01); *G10L 13/02* (2013.01); *G10L 15/005* (2013.01); *H04N 21/4755* (2013.01); *H04N 21/4856* (2013.01)

(58) Field of Classification Search
CPC ........... H04N 21/4856; H04N 21/4532; H04N 21/4755; G10L 13/02; G10L 15/005; G10L 15/26
See application file for complete search history.

(56) References Cited

U.S. PATENT DOCUMENTS

| | | | |
|---|---|---|---|
| 9,854,324 B1 * | 12/2017 | Panchaksharaiah | ........................ H04N 21/8106 |
| 10,182,266 B2 | 1/2019 | Panchaksharaiah et al. | |
| 11,665,392 B2 | 5/2023 | Chandrashekar et al. | |
| 2011/0246172 A1 | 10/2011 | Liberman et al. | |
| 2017/0374423 A1 * | 12/2017 | Anderson | ............ H04N 21/442 |
| 2020/0007946 A1 * | 1/2020 | Olkha | ................... G06F 40/263 |

(Continued)

FOREIGN PATENT DOCUMENTS

JP        2013201505 A      10/2013

OTHER PUBLICATIONS

Hinsvark et al., "Accented Speech Recognition: A Survey," [5] https://arxiv.org/abs/2104.10747 pp. 1-5 (2021).

(Continued)

*Primary Examiner* — Nicholas R Taylor
*Assistant Examiner* — Ho T Shiu
(74) *Attorney, Agent, or Firm* — HG LAW LLP

(57) ABSTRACT

Systems and methods for automatically activating subtitles during presentation of a media asset are disclosed. In an example, a media application stores a user profile including a language classification probability vector corresponding to the user profile. The media application generates for display a media asset via a user interface. The media application compares the language classification probability vector to audio of the media asset presented via the user interface, and in response to determining that the audio of the media asset is beyond a threshold distance from the language classification probability vector, activates subtitles for the media asset.

18 Claims, 13 Drawing Sheets

100
110
120
112 — User Profile
User: A
114 — Language Classification Probability Vector
(LCPV): [0.8, 0.0, 0.1, 0.5, 0.1, 0.1]
124
122
Media Asset
Language Classification Probability Vector
(LCPV): [0.8, 0.0, 0.1, 0.1, 0.0, 0.5]

Distance |A-B| = [0.0, 0.0, 0.0, 0.4, 0.1, 0.4]

Distance > Threshold = Subtitles ON

(56) References Cited

U.S. PATENT DOCUMENTS

2023/0402033 A1* 12/2023 Heinzmann ............. G10L 15/22

OTHER PUBLICATIONS https://aws.amazon.com/about-aws/whats-new/2021/08/amazon-chime-sdk-amazon-transcribe-amazon-transcribe-medical/ retrieved from internet Aug. 29, 2023.
https://meeting.tencent.com/support-doc-detail/1174/index.html retrieved from internet Aug. 29, 2023.
https://support.google.com/meet/answer/9300310?hl=en&co=GENIE. Platform%3DDesktop retrieved from the internet Aug. 29, 2023.
Najafian et al., "Automatic accent identification as an analytical tool for accent robust automatic speech recognition," https://www.sciencedirect.com/science/article/abs/pii/S0167639317300043 (2020).
Radzikowski et al., "Accent modification for speech recognition of non-native speakers using neural style transfer," EURASIP Journal on Audio, Speech, and Music Processing, pp. 1-10 (2021).
Timed Text Markup Language 1 (TTML1) (Third Edition) https://www.w3.org/TR/2018/REC-ttml1-20181108/ retrieved from internet Aug. 29, 2023.

* cited by examiner

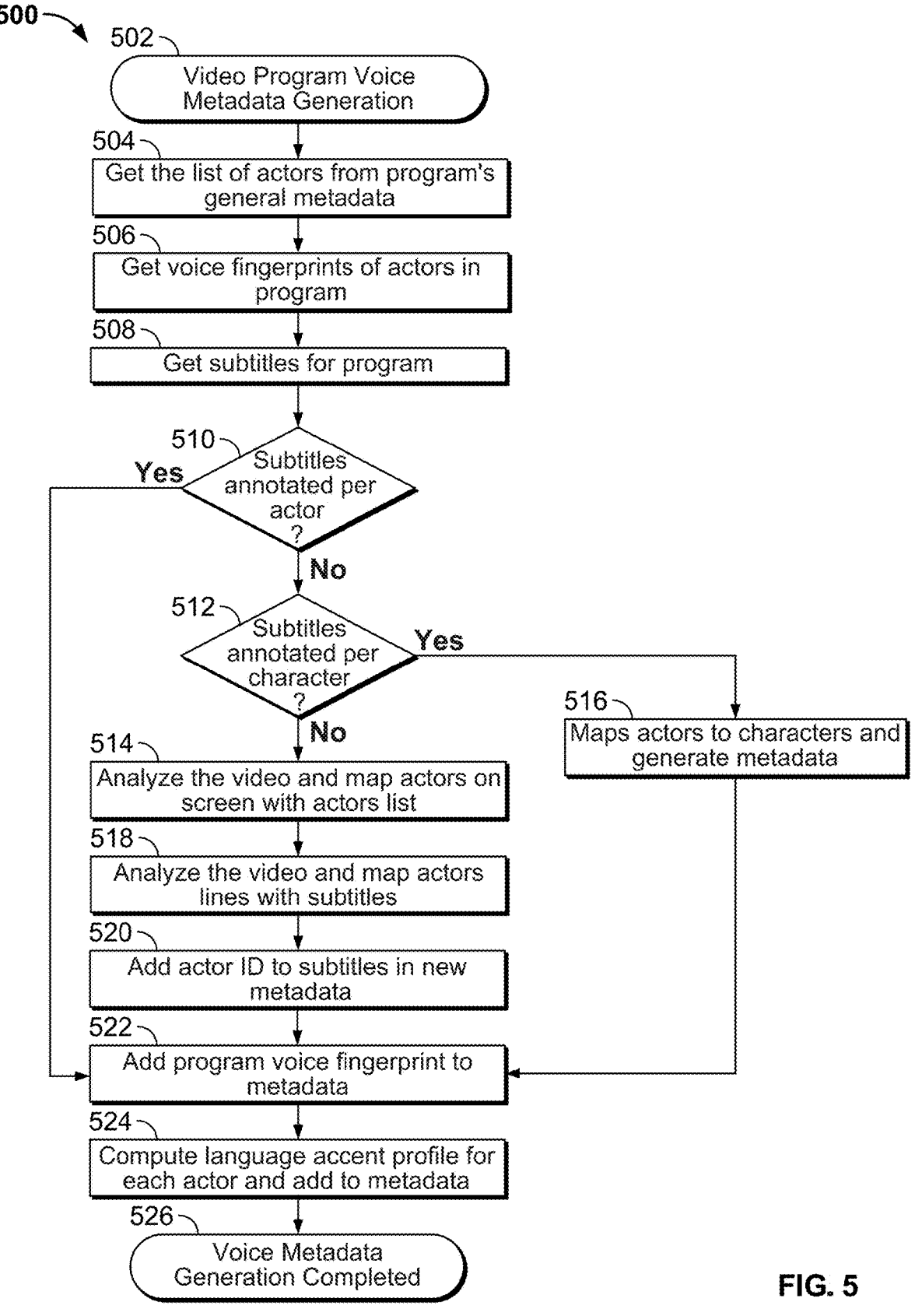

500

502 Video Program Voice Metadata Generation

504 Get the list of actors from program's general metadata

506 Get voice fingerprints of actors in program

508 Get subtitles for program

510 Subtitles annotated per actor ?

Yes

No

512 Subtitles annotated per character ?

Yes

No

516 Maps actors to characters and generate metadata

514 Analyze the video and map actors on screen with actors list

518 Analyze the video and map actors lines with subtitles

520 Add actor ID to subtitles in new metadata

522 Add program voice fingerprint to metadata

524 Compute language accent profile for each actor and add to metadata

526 Voice Metadata Generation Completed

FIG. 5

```
<ttm:agent xml : id="connery" type="person">
    <ttm:name type="family">Connery</ttm:name>
    <ttm:name type="given">Thomas Sean</ttm:name>
    <ttm:name type="alias">Sean</ttm:name>
    <ttm:name type="full">Sir Thomas Sean Connery</ttm:name>
</ttm:agent>
<ttm:agent xml : id="bond" type="character">
    <ttm:name type="family">Bond</ttm:name>
    <ttm:name type="given">James</ttm:name>
    <ttm:name type="alias">007</ttm:name>
    <ttm:actor agent="connery"/>
</ttm:agent>
```

FIG. 6

```
<body region="subtitleArea">
   <div>
...
      <p ttm:agent="bond" xml:id="subtitle50" begin="50.76s" end="53.45s">
       A Martini, shaken, not stirred please
      </p>
...
   </div>
</body>
```

FIG. 7

METHODS AND SYSTEMS TO AUTOMATE SUBTITLE DISPLAY BASED ON USER LANGUAGE PROFILE AND PREFERENCES

BACKGROUND OF THE INVENTION

One or more embodiments of the present disclosure relate to automatic activation or deactivation of subtitles during presentation of a media asset. Other embodiments relate to activating or deactivating subtitles in a video conferencing environment, and/or in the context of downloading or recording media assets for later consumption. Some embodiments or aspects may relate to other features, functionalities, or fields.

SUMMARY

Systems and method are described herein for selectively activating subtitles during the display of a media asset (e.g., a show, movie, or any other form of video including user generated or live video), during a conference call (e.g., a video conference), and for recording or downloading of media assets for later playback.

With the expanding universe of media available to users around the world, it is more and more common for viewers to watch media assets having audio in a language other than the viewer's native language. Additionally, many actors have accents which may be difficult to understand depending on the proficiency of the viewer. For media assets in which an actor speaks in a language or accent the viewer is unfamiliar with, it may be advantageous to turn on subtitles to get a better understanding of what is going on. It is not uncommon for native speakers in the United States, for example, to turn on subtitles for British, Australian or Indian movies, or for English viewers to turn on subtitles for Irish or Scottish productions. Current approaches do not provide sufficient ability to automatically turn on subtitles based on the language proficiency of the viewer in relation to the languages and accents used in a given show or movie.

In one approach, subtitle options media applications may be set at a high level and are simply "on" or "off." Additionally, these settings may be buried deep into the advanced settings menu. A more tailored approach is needed that includes the ability to turn on subtitles only for certain shows, genres, actors, languages, or accents.

In another approach, subtitles may be activated for a media asset based on the accent detected in the media asset. However, there is no ability to compare the detected accent to that of the user, or to account for differences in accents from one actor to another.

In another approach, subtitles may be activated based on a sound profile selected by a user. However, these sound profiles are manually entered by the user, and do not provide the ability to tailor the user experience with subtitles automatically activated based on the genre, actor, or accent.

To solve these problems, systems and method are provided herein for enabling more tailored control over when subtitles are displayed, based on the user profile and the characteristics of the media asset being displayed. In one example, a media application identifies a language classification probability vector (LCPV) for a user. The LCPV corresponds to how close or far away the user's voice is from a baseline accent database. That is, for an English speaker, the LCPV can be used to quantify a user's accent to determine how close the user's voice fingerprint is to a US accent (and/or variations of US accents), UK accent, Indian accent, French accent, etc. The LCPV is then compared to the language profile of the media asset being displayed. If the LCPV is beyond a threshold distance from the language profile of the media asset (i.e., the user's accent is sufficiently different from the accent(s) in the media asset), then the subtitles may be automatically activated for some portion or all of the media asset. In some examples, the distance may be determined using component subtraction, Euclidian distances, or cosine similarity. This automatic activation provides a more tailored experience for the user.

Some embodiments of the present disclosure also enable subtitles to be activated on a per-actor basis. That is, within a show, one or more actors may use an accent that is difficult to understand. The actor's speech may be compared to the LCPV (using any suitable technique, such as by passing the actor's speech through an analysis to determine a respective LCPV for the actor's speech), and if the distance is beyond a threshold distance, subtitles may be automatically activated for the portions of the media asset in which that actor speaks. This provides a more tailored experience for the user, who may have difficulty understanding a particular actor.

In some embodiments, the media application may generate or modify the LCPV based on input audio corresponding to the user profile. That is, the media application may receive input audio (e.g., the user's speech), and generate or update the LCPV to more accurately reflect the probabilities associated with the languages and accents of the user profile. Additionally, in some embodiments the media application may generate or update the LCPV based on received user inputs, such as turning subtitles on or off for various media assets or actors within a media asset. This provides a more tailored experience for the user by maintaining an updated understanding of the user's language proficiency and subtitle preferences.

In some embodiments, the media application may present a list of actors included in a media asset. The media application may then receive an input selecting one or more of the actors, and may then activate subtitles, mute, or replace the audio corresponding to the selected actor(s). This provides a more tailored experience for the user, who may have difficulty understanding a particular actor. Furthermore, in some embodiments, the media application may store the selection of an actor. Then, when another media asset is presented that includes that selected actor, the media application may automatically activate subtitles for the actor if the actor's speech in both media assets is sufficiently similar. This provides an improved user experience by enabling the user to have subtitles activated on a per-actor basis across media assets.

In the context of video conferencing, the advent of work from home worldwide has made it common for video conferences to occur between people who do not natively speak the same language. In the United States, a massive population of first-generation immigrants have a wide variety of accents and enunciation even within the native population, making it so that intelligibility of spoken words often varies from participant to participant. Additionally, in cases where the native language is shared amongst participants, but the country of origin is different (e.g., England, Australia and the United States), the accents of the users can vary a lot between participants making some participants difficult to understand.

In one approach to video conferencing subtitles, the video conferencing platform enables global control of subtitles such that they are either on for all participants or off for all participants. But this approach does not allow individual participants to activate subtitles.

In another approach to video conferencing subtitles, subtitles may be automatically activated in response to detection of a high noise level on the sending or receiving end of a video conference call. However, this approach does not provide an ability for each participant to control the subtitles they see from each other participant.

To solve these problems, systems and methods are provided herein to enable a participant to turn on subtitles for another target participant, without requiring every participant to have subtitles turned on, and without letting other participants know. Some participants may be reluctant to let others know they are having difficulty understanding another participant, and so enabling each participant to individually activate subtitles provides a better user experience without risking embarrassment.

In the context of recording or downloading media assets for later playback, it may be beneficial to have more information about the identity of the user recording or downloading the media asset, and/or for whom the recording or downloading is being done. In one approach, a media asset may be recorded or downloaded for later playback, but without any further information about the identity of the user who will be watching that recording or download aside from the current active user profile. When multiple people share a single account, or when a user selects to record or download a media asset for another user or another user profile, the information about the user who will be watching at a later time may not be factored in.

Systems and methods provided herein enable personalization of the metadata or content of recorded or downloaded assets to a specific user. This enables the recorded or downloaded media asset to be modified to include subtitle information (e.g., whether subtitles are on or off, which actors have subtitles turned on, etc.) tailored to the specific user, as well as various advertising specific information (e.g., inserting advertisements targeted to the specific user, overlaid advertising within scenes of the media asset, and more). In some embodiments, the media application may provide an option to download for a specific user (e.g., download for user A, user B, or all users), which may then dictate which specific subtitles are included, which advertisements are included, and other personalization of the media asset to the selected user(s).

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 5 shows a flowchart of example steps for generating voice fingerprints and language profiles for a media asset, in accordance with embodiments of the disclosure;

FIG. 6 shows an example of TTML metadata for creating a relationship between a character and an actor, in accordance with embodiments of the disclosure;

FIG. 7 shows an example of TTML metadata identifying the character or actor for a line of dialogue, in accordance with embodiments of the disclosure;

DETAILED DESCRIPTION

Figure 1:
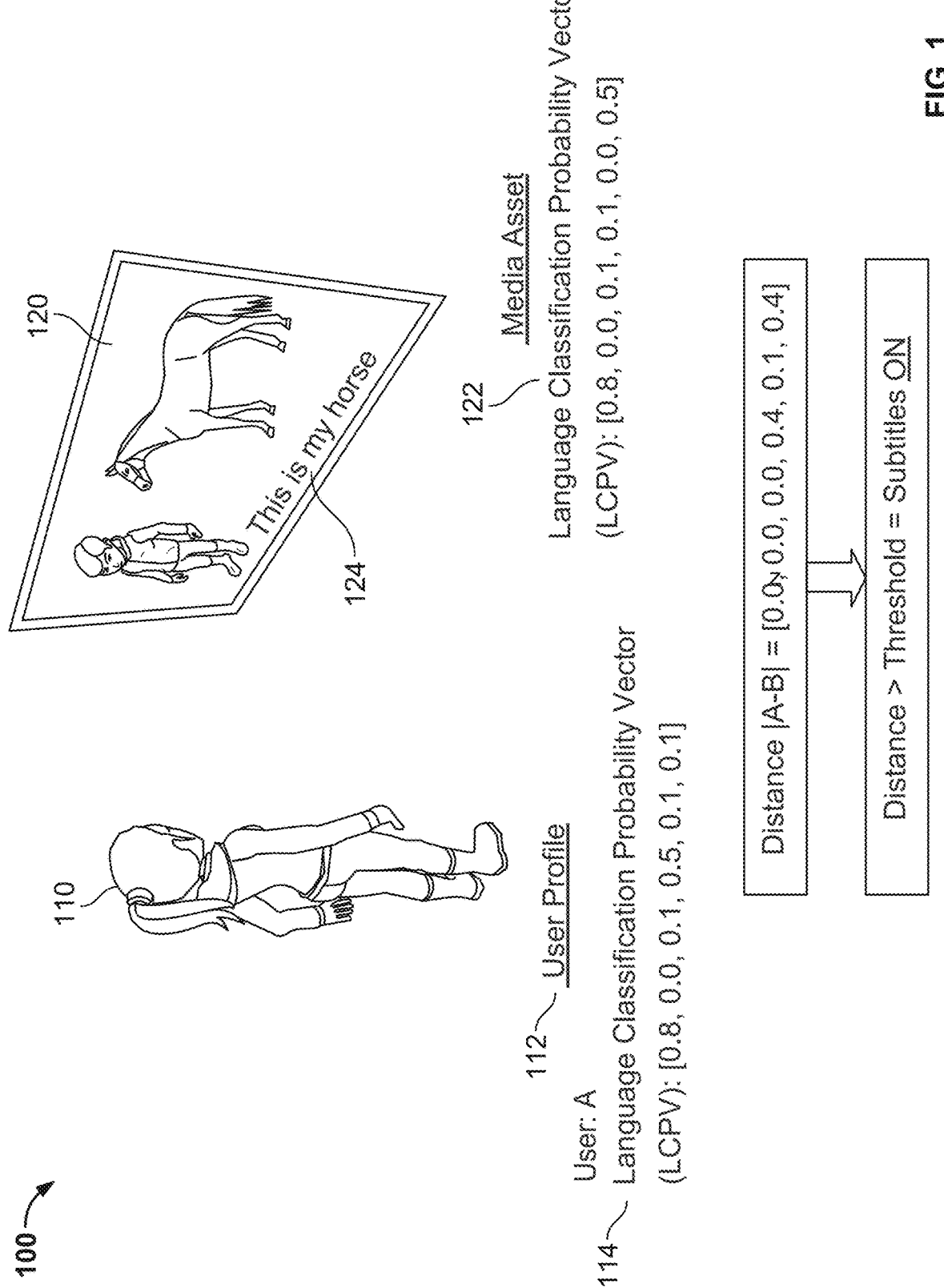
FIG. 1 shows an illustrative scenario in which subtitles are activated based on a user profile and the media asset being presented, in accordance with embodiments of the disclosure.

As noted above, embodiments of the disclosure relate to providing more targeted subtitle display based on the language profile of the user. The use of subtitles when viewing a media asset is becoming more and more popular, even with people who are not hard of hearing. Many streaming platforms offer an option for pure subtitling in the native language of the program without descriptive captions. Subtitling options are also offered by video conferencing platforms and live broadcasts, and can be performed in real-time using automatic speech recognition (ASR) or other methods.

Subtitles may be controlled by the user who decides to turn them on or off. As noted above, many streaming platforms have an option at the top-level menu to turn subtitles on or off globally regardless of the program. For example, some platforms (e.g., HBO Max and Amazon Prime) offer subtitle options per viewer account, whereas other platforms (e.g., Cox Contour) have a global setting that applies to all channels that offer closed captions (i.e., Contour does not offer anything other than line 21 closed captions). In some video conferencing platforms (e.g., Zoom and Teams video conferencing), subtitling is also a global setting controlled at the video session level and applies to all participants both on the receiving and emitting end.

Embodiments of this disclosure propose expanding subtitling capabilities to give users more control over the way that subtitles are generated and displayed. While some embodiments are described in the context of presentation of media assets (e.g., via a streaming service), it should be understood that the features and approaches described with respect to media assets are also applicable to various other media and systems, including OTT, STB and video conference environments.

In addition to their traditional movie, TV series, and documentaries, some platforms (e.g., HBO Max) also provide programs that have been shown live on cable networks and linear TV as on-demand options. Captioning for these programs is often an exact transcription of the line 21 closed captions even though the programs are being consumed on-demand. Line 21 closed captions for live events are often significantly delayed compared to what is actually being said. For the non-hard-of-hearing public, this can be unsettling as the brain has a hard time reconciling what is being presented audibly with the visually presented subtitles. Even a delay of a few hundred milliseconds is sufficient to throw the audience off, and line 21 closed captions are often delayed by up to 5 seconds. However, some platforms (e.g., HBO Max) do not offer to select only synced captions. If closed captions are enabled, they are enabled for all programs. Even if the user repeatedly disables captions for a category of programs and enables them for others, the platform is unable to automatically disable captions for programs for which the user does not want captions. Additionally, subtitling for video programs is often fragmented. If a movie is in English but includes certain parts in another language, the non-closed-caption English subtitles often do not include the part(s) of the movie in the other language. This can be frustrating for viewers who do not understand the other language.

With these challenges in mind, embodiments of the disclosure enable presentation of media assets via various media streaming or media presentation platforms on a per content category basis. Embodiments also enable a user profile to be generated and/or updated to reflect a language profile of the user, and to use that language profile to automatically activate or deactivate subtitles. Embodiments also enable automatic activation or deactivation of subtitles on a media asset basis, genre basis, for only certain actors, characters, or "subjects" of a media asset, for certain actors, characters, or subjects across multiple media assets, and more. Embodiments also enable automatic activation or deactivation of subtitles based on comparison of a user profile to the audio of the media asset, and to enable or disable subtitling for participants in a video conferencing system.

The term "subtitle" is used extensively in this disclosure. It should be understood that the terms "subtitle," "captions," "closed captions," and/or other similar terms may be used interchangeably to refer to the spoken words rendered into text for a given media asset, video conferencing participant, or other media content. Noises, music, or other sounds that are not spoken words rendered into text may not apply.

Additionally, the terms "language profile," "voice fingerprint," and "LCPV" are used interchangeably in this disclosure. Each of these terms may refer to the quantifiable aspects of a base language and accent(s) present in a given user's speech, media asset, actor's speech, character's speech, or subject's speech. Embodiments disclosed herein may be described with respect to one or more of these terms, and it should be understood that the other terms may be substituted instead, while remaining within the scope of this disclosure.

Furthermore, some examples involve terminology regarding speech, speaking, or other similar terms. It should be appreciated that these terms may include any spoken noises that could be interpreted as speech, including speaking, talking, yelling, singing, grunting, or otherwise causing sound to be made by a person. Additionally, these terms may also include any similar sounds generated by a computer or computing device, such as computer generated speech, computer generated yelling, computer generated singing, or any other similar terms.

FIG. 1 shows an illustrative scenario 100 in which subtitles are activated based on a user profile and the media asset being presented. FIG. 1 shows a user 110 having an associated user profile 112. FIG. 1 also shows a media asset 120 presented on a screen with corresponding subtitles 124. A media application may provide a plurality of media assets (e.g., video programs) in a plurality of languages, wherein subjects of the media asset (e.g., actors) may speak in a plurality of accents and languages.

The user profile 112 corresponding to the user 110 may reflect various information about the user 110, such as an identifier, demographic information, a preferred UI language, etc. The user profile 112 may also include a language profile detailing a default and/or user-defined baseline language (e.g., British English). The language profile may also include a language classification probability vector (LCPV), described in further detail below.

In some examples, the media application may determine the language profile for the user based on user inputs (e.g., a selection of a baseline language). Additionally or alternatively, the media application may determine the language profile for the user automatically based on a default setting, based on user speech, based on user actions with respect to various media assets and/or subjects, and more.

In an example, the media application may automatically adjust the language profile for a given user by requesting that the user to speak using a voice remote (or other device having a microphone) and running an analysis and/or classification of their accent and/or language. In another example, the media application may receive a third-party language profile from the user's voice assistant, for example, or from a video conferencing service with which the user has interacted. In one example, a Japanese person based in the US may select US English as their baseline language, but the media application may also classify the user as Japanese English if the user exhibits a Japanese accent while speaking English.

The language profile of the user may include a LCPV that reflects the nuances of the user's speech. In some examples, the media application may use machine learning, a neural network, or some other process to determine a model that can be used to classify input speech. The media application can use the model to classify the input speech to determine the probabilities that the speech includes various languages and/or accents. For example, a neural network classifier may be trained using a large plurality of annotated records of people speaking with various accents. Input speech for a user can then be input to the trained classifier to determine the component accents and corresponding probabilities that are included in the input speech.

In some examples, the LCPV for a user may reflect how far or close the user's speech (e.g., voice fingerprint) is to the baseline accent for various languages. As such, the LCPV may be a vector including multiple discrete values corresponding to various languages and accents. In FIG. 1, for example, the LCPV 114 of the user 110 corresponds to an English speaker, with accents corresponding to US (0.8), UK (0.0), Indian (0.1), French (0.5), Japanese (0.1), and Southern drawl (0.1). Each component is associated with a value between 0 and 1, wherein 0 corresponds to no accent, and 1 corresponds to the baseline accent used for training. The user 110 with the LCPV 114 [0.8, 0.0, 0.1, 0.5, 0.1, 0.1]

has a stronger French accent than a different user with an LCPV [0.8, 0.0, 0.15, 0.3, 0.0, 0.2], but both have a dominant US-French accent.

As described in further detail below, the media application may also determine a language profile, voice fingerprint, and/or LCPV for the audio presented as part of the media asset 120. As used herein, the terms language profile, voice fingerprint, and LCPV may be used interchangeably to refer to the specifics of the languages and accents included in the audio of a media asset. In FIG. 1, the LCPV 122 [0.8, 0.0, 0.1, 0.1, 0.0, 0.5] for the media asset 120 indicates that the audio of the media asset 120 includes a US-Southern drawl dominated accent.

In some examples, determining the language profile, voice fingerprint, and/or LCPV for a given media asset can be done for the media asset as a whole, for each sentence spoken in the media asset, for each subject (i.e., actor or character) in the media asset, for each segment of the media asset (e.g., 5 seconds, 10 seconds, etc.), or for some other segmentation of the media asset. The language profile, voice fingerprint, and/or LCPV for the media asset may then be included in the metadata for the media asset. In some examples, the media application makes the language profile, voice fingerprint, and/or LCPV available in real time to the client of the user, either generated at the server and transmitted to the client as metadata or detected by the playback client itself.

The language profile, voice fingerprint, and/or LCPV of the media asset may be determined using the same classifier as the one mentioned above with respect to the user profile, and/or may come from an existing media platform or database of actors', characters', or subjects' language profiles.

The media application may then compare the LCPV 114 of the user 110 to the LCPV 122 corresponding to the media asset 120. This comparison may include determining a distance, difference, proximity, or some other mathematical relationship between the two LCPVs. In some examples, the comparison can include component subtraction, Euclidian distances, and/or cosine similarity.

For example, If A is the LCPV for the user 110 and B is the LCPV for the media asset 120 (or for a given subject in the media asset 120), component subtraction |A−B| results in an output vector where a positive value in any of its components indicates a difference in accent scoring for the accent corresponding to that component. That value can be used to detect accent differences individually per accent.

In another example, the Euclidian distance |A−B| is a summary of the component subtractions and results in a single number that can be used to quickly assess how different two LCPVs are. Since only a single number results, this technique may include less information, but may provide a more streamlined approach to determining differences between two language profiles, voice fingerprints, and/or LCPVs.

In another example, cosine similarity may be used to determine the distance between two LCPVs. Cosine similarity is similar to Euclidian distance in some respects, and may use the following formula:

$$\text{cosine similarity} = S_C(A, B) := \cos\theta = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

Cosine similarity returns a normalized value between −1 and 1, wherein 1 indicates that A and B are identical, and −1 indicates that A and B are opposite.

Then, based on the comparison resulting in a different greater than a threshold, the media application may automatically activate or deactivate subtitles for the media asset, subject, or other subset for which the LCPVs were compared. In some examples, certain accents may correspond to a different threshold than other accents, because some accents may be more easily understood than others even if the measured difference is the same. That is, the threshold difference for which subtitles are automatically activated may be smaller for a French-English accent than for a Scottish-English accent, for example. Thus, the threshold may change depending on the accents included in the LCPVs, and/or may be different for different accents, techniques for measuring the difference between LCPVs, and may not be a single value.

In this disclosure, some examples may refer to comparison of LCPVs, language profiles, and/or voice fingerprints for various subjects, participants, users, and more. It should be appreciated that each comparison may be between entities having the same format (e.g., a first LCPV and a second LCPV), and/or between entities that may have different formats (e.g., an LCPV and a voice fingerprint). In cases where the two entities being compared do not share the same format, one or both may be converted into a shared format so that a direct comparison can be performed. For instance, a first language profile may be converted into a first LCPV in order to be directly compared to a second LCPV. Other conversions are contemplated as well.

Figure 2A:
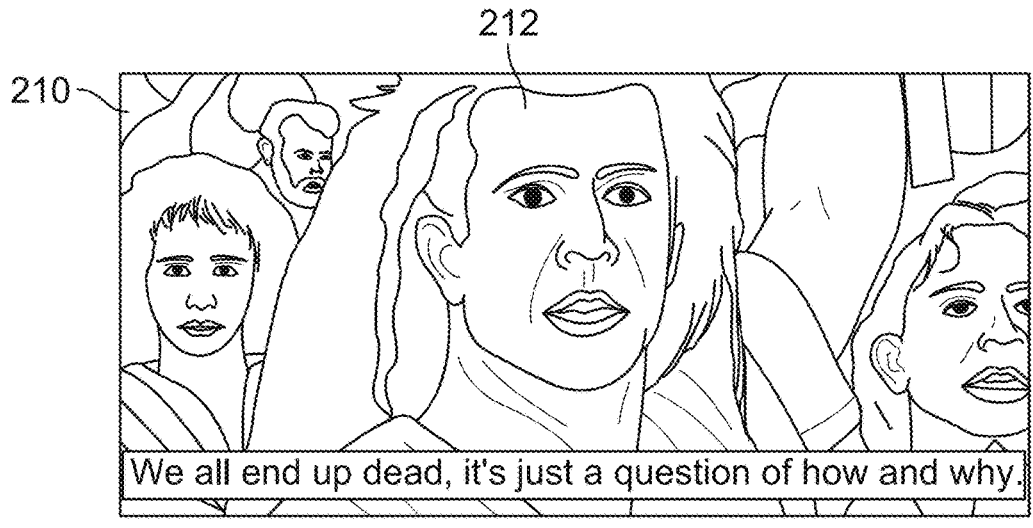
FIGS. 2A-C show dynamic captioning during presentation of a media asset, in accordance with embodiments of the disclosure.
Figure 2B:
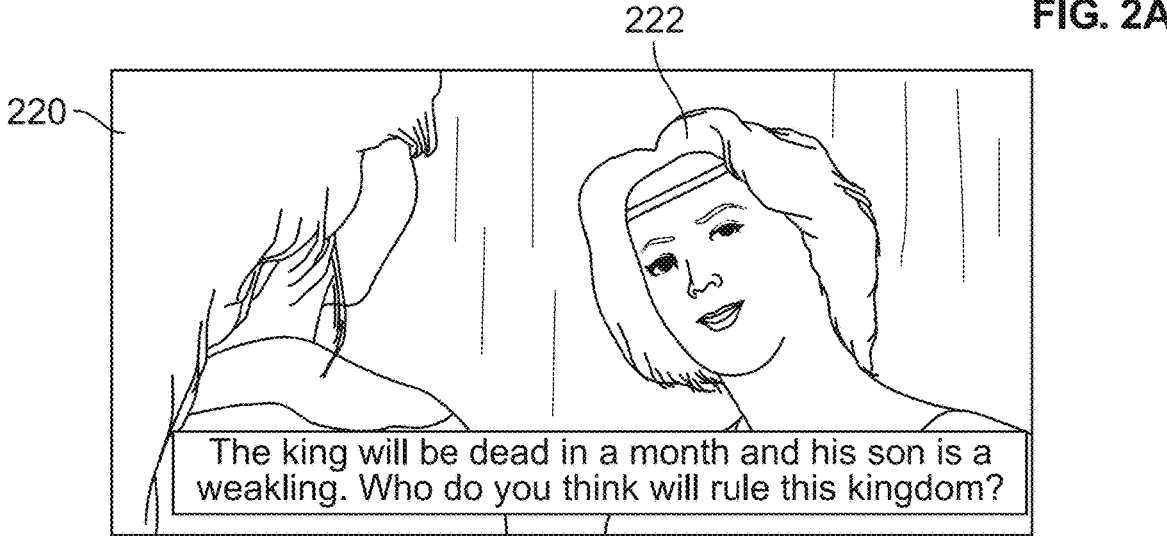
Figure 2C:
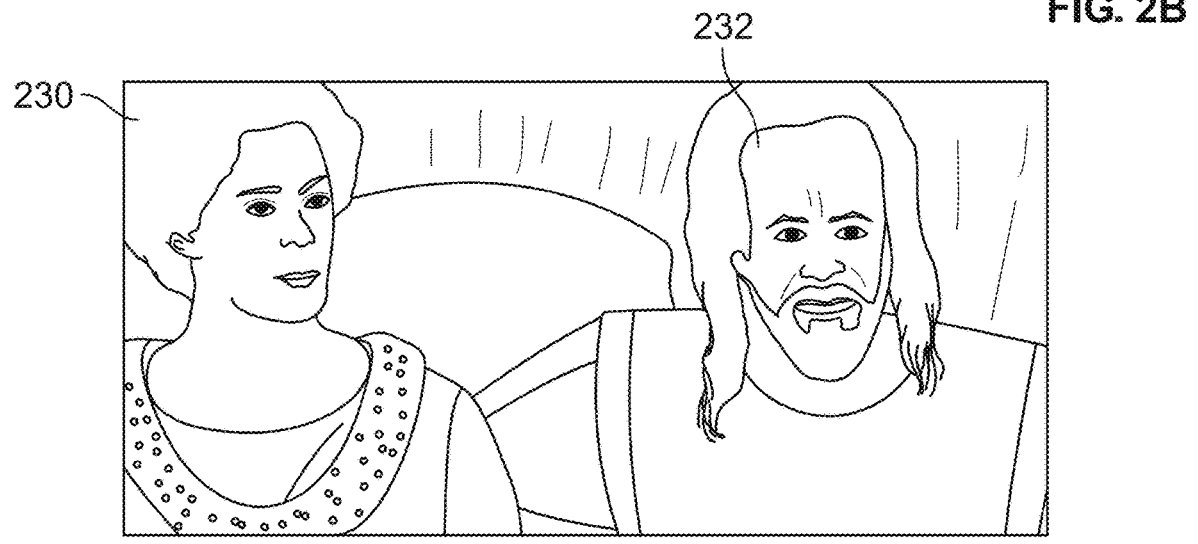

FIGS. 2A-C illustrate how automatic subtitle activation and deactivation can be dynamic during the presentation of a given media asset, in this case the movie Braveheart. When a media asset has various subjects (e.g., actors or characters) that have different accents and thus different proximity to the viewer's language profile, subtitles may be displayed for only a subset of the subjects in the media asset as illustrated in FIGS. 2A-C.

In this example, the user profile of viewer watching Braveheart is set to English as the primary language, and has a dominant English-UK accent reflected in the corresponding LCPV. Some segment(s), subjects, scenes, or other subset of the media asset may have corresponding LCPVs that are beyond a threshold distance from the user profile LCPV, while other segment(s), subjects, scenes, or other subsets of the media asset may have corresponding LCPVs that are not beyond the threshold distance. The threshold used for comparison may be the same or different for each segment, subject, scene, or other subset depending on the particular accent(s) present within the corresponding LCPV. In some examples, the media application may dynamically adjust the threshold during play of the media asset. For instance, the threshold may be adjusted based on parameters such as delivery speed or intelligibility. The threshold may be decreased when a delivery speed is high, there are loud background noises, or there are soft voices, and may be increased when a delivery speed is low, there are not loud background noises, and not soft voices.

FIG. 2A shows a first scene 210 of the media asset, wherein the subject 212 speaks in a Scottish accent. The media application automatically turns on the subtitles for subject 212 based on the difference between the LCPV of the subject 212 in the media asset and the LCPV of the user profile. That is, the media application determined that the LCPV of the subject 212 is beyond a threshold distance from the LCPV of the user, and thus the user may have difficulty understanding the accent of the subject 212.

FIG. 2B shows a second scene 220 of the media asset, wherein the subject 222 speaks in a French accent. The media application automatically turns on the subtitles for subject 222 based on the difference between the LCPV of the subject 222 and the LCPV of the user profile. That is, the media application determined that the LCPV of the subject 222 is beyond a threshold distance from the LCPV of the user, and thus the user may have difficulty understanding the accent of the subject 222.

FIG. 2C shows a third scene 230 of the media asset, wherein the subject 232 speaks in an English accent. The media application automatically turns off the subtitles for the subject 232 (or maintains the subtitles in the off state) based on the difference between the LCPV of the subject 232 and the LCPV of the user profile. That is, the media application determined that the LCPV of the subject 232 is not beyond a threshold distance from the LCPV of the user, and thus the user will not likely have difficulty understanding the accent of the subject 232.

In some examples, the media asset may include two or more subjects in a scene. Subtitles may be activated for one, both, all, a subset, or none of the subjects depending on the corresponding LCPVs for each subject and the user profile. Where two or more subjects in the media asset have subtitles activated, the media application may style the subtitles based on the corresponding subject. Illustratively, subtitles for actor A (or character A) can be displayed in a first color whereas subtitles for actor B (or character B) can be displayed in a second color. Other style changes can take place as well, overriding the style sheet in the subtitle side-car file such as font family, size, style, placement on the screen and other similar characteristics.

Figure 3:
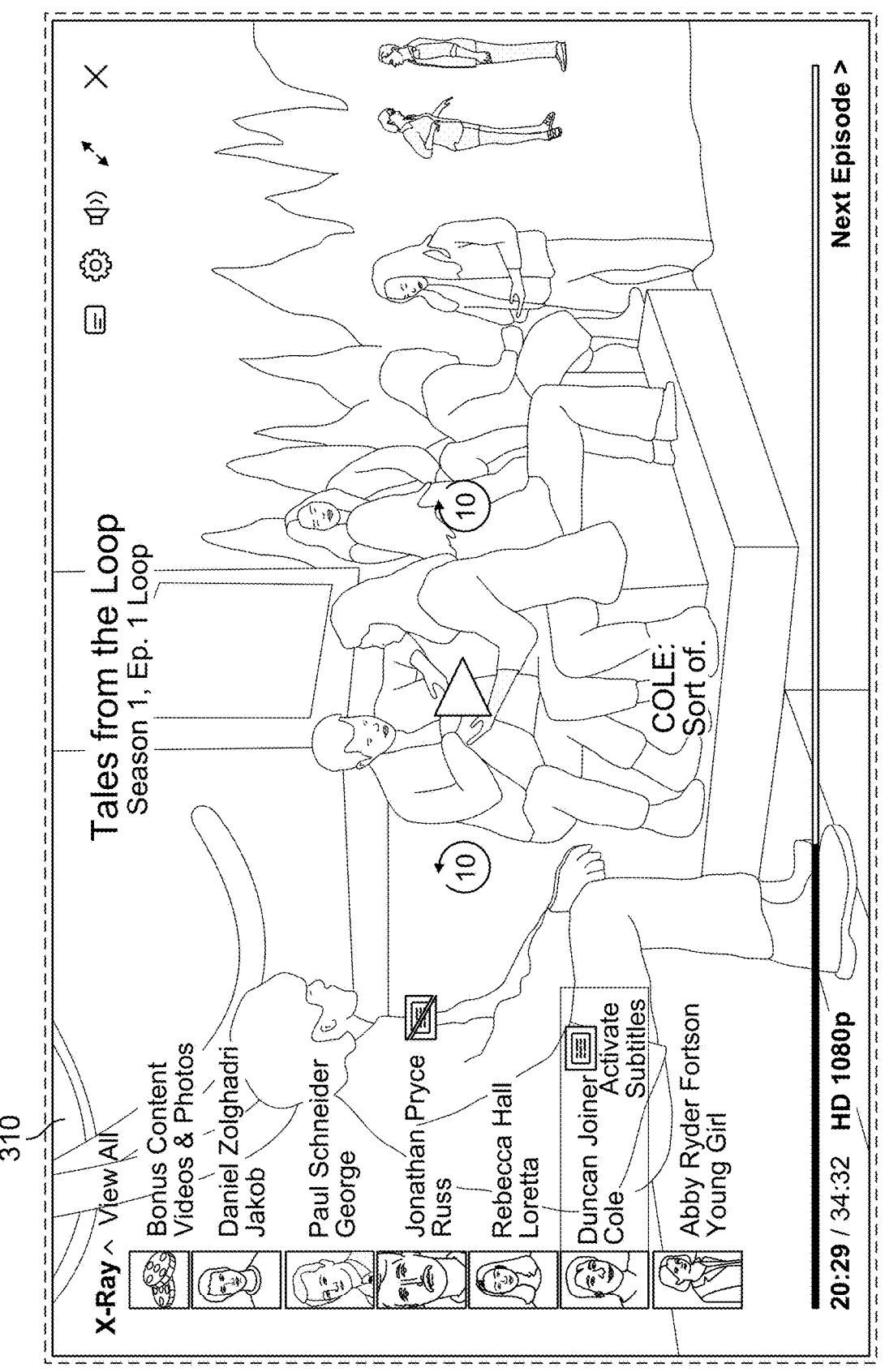
FIG. 3 shows an example user interface that enables activation of subtitles for one or more subjects in a media asset, in accordance with embodiments of the disclosure.

In some examples, a user may select one or more subjects in the media asset for which subtitles should be activated. FIG. 3 shows an example user interface 310 that enables user-selected activation of subtitles for one or more subjects in a media asset. The media application may present a list of subjects corresponding to the media asset (e.g., actors or characters), and may receive a selection of a selected subject or subjects from the list of subjects. In response, the media application may automatically activate subtitles for the media asset for those selected subjects, and/or for the portions of the media asset in which the selected subject or subjects speak.

Once subtitles are enabled for a given subject, any other media asset that includes the same subject may have subtitles enabled for that subject as well. This may be done using Timed Text Markup Language (TTML) discussed in further detail below with respect to FIGS. 6 and 7.

In some examples, the media application may detect when an input to enable or disable subtitles for a given media asset or subject is received, and may use this information to control captions for other media assets. For example, if a user is watching an episodic program whose category of program has subtitles enabled in the global settings for this user, but the user disables subtitles while watching that program, the next time the user watches the same episodic program, subtitles would not be displayed. Similarly, if the user re-enables subtitles, subtitles will be activated for the next episodes. This may also apply to controlling subtitles on a channel basis, when a user subscribes to different channels and watches those regularly (e.g., on YouTube or another social media application).

In some examples, the media application may receive an input to mute the media asset via a remote, clicking of a button, reduction in volume to below a threshold level, or other user input. In response, the media application may then automatically turn on subtitles of the corresponding media content. This may apply when the media application is presenting multiple media assets at a same time, and receives a request to mute one of the media assets, or when a user requests to temporarily mute audio for a media asset in response to another event or request while the user continues watching the content (e.g., an incoming phone call).

In some examples, the media application may receive user input (e.g., a click or button selection), and may then determine which subject was currently speaking when the input was made. In response, the media application may turn on subtitles for that subject only. In response to user input during presentation of media asset, the media application may activate subtitles for the whole show, for the currently speaking subject, for all audio that include the currently presented language (e.g., all subjects that speak in the same language as the speaker when the input was received). For example, a media asset may be primarily in English but with some Russian scenes. If the media application receives input to activate subtitles during presentation of one of the Russian scenes, all other Russian scenes in the media asset may be presented with subtitles as well. Similarly, if the media application receives input to activate subtitles while a given subject is speaking in Russian, all other subjects who speak in Russian during the media asset may also have subtitles activated.

In some examples, the user profile of a person viewing the media asset may also indicate whether subtitles should be automatically activated for certain languages or accents other than the primary language of a given media asset. That is, when a user watches a media asset that includes multiple languages (e.g., primarily English, with certain scenes in Russian), the media application may or may not activate subtitles for the scenes in Russian depending on the language profile of the user. For example, if a user has a strong Russian accent in English and they are watching a movie primarily in English but with some parts in Russian, the media application may elect to not display Russian subtitles for the dialogue in Russian (since the user likely understands Russian anyway, given the strong Russian accent indicated in the user profile). If the media application receives an input to activate subtitles anyway, or if the media application receives an input to rewind the media asset to replay the part including the Russian language, the media application may modify the user's corresponding language profile to reflect these inputs, such that a next time a Russian language part is presented in a media asset, the media application may activate subtitles.

In some examples, the media application may include a global setting to selectively activate subtitles for certain media asset categories. For example, an OTT client application may allow the user to disable subtitles for live programs. Other categories may include foreign programs and programs that include foreign dialogues, among others.

In some embodiments, activating subtitles for a subject in one media asset may cause the media application to modify the corresponding user profile. When the media application determines that subtitles should be activated for a first subject (i.e., a first actor, character, or other subject) in a first media asset (e.g., via user input requesting subtitles or via automatic determination based on a comparison of the LCPVs), the media application may store a reference to the first subject in the corresponding user profile. The media application may then identify a second media asset that includes the first subject. The media application may then compare a first language profile associated with the first subject from the first media asset to a second language profile associated with the first subject from the second media asset. And in response to determining that the first language profile and the second language profile for the first subject are within a threshold distance, the media application may activate subtitles for the first subject in the second media asset. That is, the subtitle activation for the first subject may be saved across multiple different media assets, so long as the language profiles of the first subject in each media asset are sufficiently similar. Because actors may have different accents or may speak in different languages in different roles, when subtitles are enabled for an actor in one program, it will also turn on in other programs if the voice fingerprint per the classifier described above in these programs is close enough to the voice fingerprint in the first program in which subtitles were turned on.

In some examples, more subject-centered actions are proposed in addition to enabling subtitles. For instance, the media application may mute a selected subject, or replace the selected subject's voice with something else such as a neutral accent, machine read of the lines for that subject, or another subject's voice. In some examples, the media application may remove the accent from the selected subject's speech. This accent removal can be specific to user profile LCPV, and may include deaccenting the selected subject's speech so that the resulting LCPV of the deaccented speech is less than the threshold distance from the user profile LCPV (i.e., removing the accent in a way the makes the resulting speech understandable by the specific user requesting the deaccented speech).

In some examples, the media application may enable voice control and/or may receive voice input to control various functionality described in this disclosure. For example, the media application may detect voice inputs such as "hey substitute Cole" (the character), or "hey subs on Duncan Joiner" (the actor). In response, the media application may activate subtitles for the selected subject identified based on the received voice input, or may take another appropriate action based on the command identified based on the received voice input (e.g., activating or deactivating subtitles, replacing a subject's voice, muting, etc.). Combinations of first name and last name for both characters and actors may also be used. This voice command functionality may be used alongside or in place of the features described with respect to FIG. 3 regarding display of a list of subjects and selection of one or more of the listed subjects.

Figure 4:
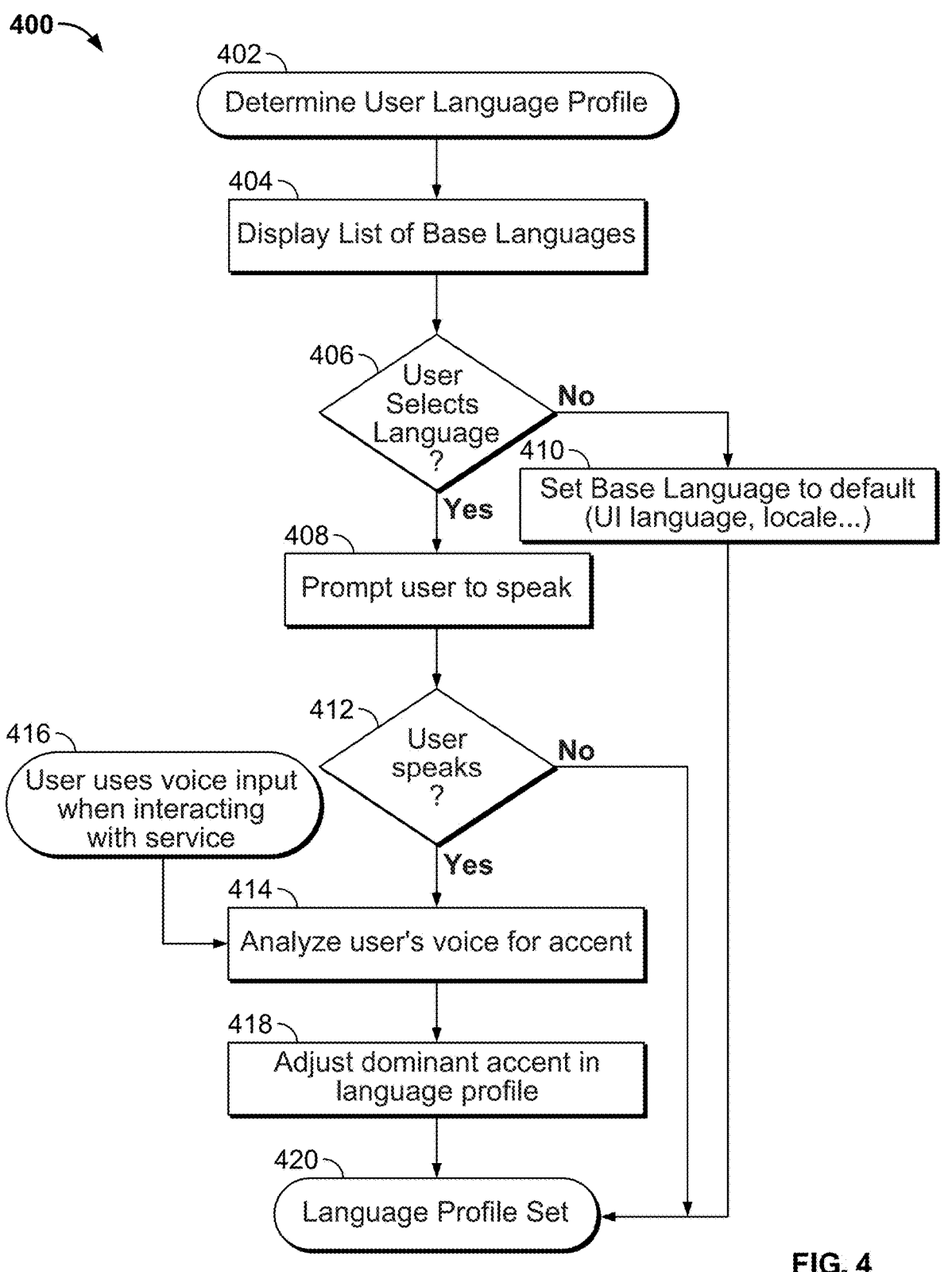
FIG. 4 shows a flowchart of example steps for determining a language profile for a user, in accordance with embodiments of the disclosure.

FIG. 4 is a flowchart of an illustrative process for determining a language profile, voice fingerprint, and/or LCPV for a user, in accordance with some embodiments of the disclosure. As shown in FIG. 4, in accordance with some embodiments, a process 400 may be executed by processing circuitry 1406 of a client device (FIG. 14). It should be noted that process 400 or any step thereof could be performed on, or provided by, the systems or devices of FIGS. 14 and 15. Some steps of process 400 may be described as being performed by a media application. In addition, one or more steps of process 400 may be incorporated into or combined with one or more other steps described herein. For example, process 400 may be executed by control circuitry 1404 of FIG. 14 as instructed by a media application implemented on the client device 1400 in order to enable the determination of a user language profile. Also, one or more steps of process 400 may be incorporated into or combined with one or more steps of any other process or embodiment, such as processes 500, 800, 900, and 1300 described with respect to FIGS. 5, 8, 9, and 13.

At step 402, the process 400 of determining a user language profile begins. At step 404, the media application may display a list of base languages via a user interface. At step 406, the media application may determine whether it has received a user input selecting one of the displayed base languages.

If the media application determines that it has received a user input selecting a base language, the media application may prompt the user to speak at step 408. The media application may receive the speech input via any suitable microphone or audio sensor such as via a voice controlled remote, and/or may receive the input speech from another source (e.g., a connected social media account, virtual assistant, or other account for which the user's speech has been recorded). The media application may then update or modify the base language selected at step 406 based on the input speech. For example, if the user selects English as the base language, and then speaks with a French accent, the media application may modify the language profile, voice fingerprint, and/or LCPV to reflect a French-English accent.

If, however, the user does not select a base language at step 406, the media application may set the base language to a default language. The default language may be determined at step 410 based on the UI language, the location, or based on some other information. The process 400 may then end at step 420.

At step 412, the media application determines whether it has detected input speech from the user. This may include receiving input speech from a microphone communicatively coupled to the media application, such as via a voice-enabled remote control. If no input speech has been detected, the process 400 proceeds to end at step 420.

If, however, the media application detects input speech at step 412, step 414 includes the media application analyzing the input speech to determine the accent(s) included in the user's speech. In some examples, at step 416 the media application may also receive input speech at various other times, such as when the user interacts with the media application to search for a media asset via a voice remote. Step 416 may occur during normal usage of the media application, different from when the user initially sets the language profile.

At step 418, the media application adjusts the language profile, voice fingerprint, and/or LCPV of the user profile based on the input speech from either or both of steps 412 and 416. This can include analyzing the input speech using a neural network or machine learning model, to determine the component accents included in the input speech.

The process 400 may then end at step 420. As noted above, however, during use of the media application, the user may make various voice inputs (e.g., to search for a media asset). These additional voice inputs may be received at step 416, and the process 400 may continue to step 414 and 418 to further adjust or modify the language profile of the user.

FIG. 5 is a flowchart of an illustrative process for generating language profiles, voice fingerprints, and/or LCPVs for a media asset, in accordance with some embodiments of the disclosure. Process 500 may be performed by the media application prior to a request to view the media asset by the user, and the language profile information may be stored in the metadata of the media asset. Alternatively, process 500 may be performed on an as-needed basis during retrieval of the media asset for presentation to the user. As shown in FIG. 5, in accordance with some embodiments, the process 500 may be executed by processing circuitry 1406 of a client device (FIG. 14). It should be noted that process 500 or any step thereof could be performed on, or provided by, the systems of FIG. 14 or 15. Some steps of process 500 may be described as being performed by a media application. In addition, one or more steps of process 500 may be incorporated into or combined with one or more other steps described herein. For example, process 500 may be executed by control circuitry 1404 of FIG. 14 as instructed by a media application implemented on the client device 1400 in order to generate language profiles, voice fingerprints, and/or LCPVs for a media asset. Additionally, one or more steps of process 500 may be incorporated into or combined with one or more steps of any other process or embodiment, such as processes 400, 800, 900, and 1300 described with respect to FIGS. 4, 8, 9, and 13.

At step 502, the process 500 of generating media asset language profiles, voice fingerprints, and/or LCPVs and corresponding metadata begins. At steps 504, 506, and 508, the media application retrieves a list of subjects included in a media asset, the voice fingerprint for the subjects in the media asset, and the subtitles for the media asset. This information may be included in the metadata for the media asset, and may be retrieved along with the media asset as it is retrieved for presentation to the user.

At step 510, the media application determines whether the subtitles for the media asset are annotated on a per-subject basis. That is, the media application determines whether the subtitles for the media asset are connected to the actor that speaks, such that there is a stored identifier for the subtitles that links each line of subtitles to the subject that speaks it. If the subtitles are connected to the subjects of the media asset, the process proceeds to step 522 (discussed in further detail below). However, if the subtitles are not connected to the subjects in the metadata, at step 512 the media application determines whether the subtitles are connected to the characters in the media asset. That is, in some examples the subtitles for a given media asset may be connected to the character, but not to the actor that speaks.

If the subtitles are connected to the characters of the media asset, the media application maps the actors to the characters at step 516, and updates the metadata to include these connections. The media application may iterate through the characters to identify the subject (e.g., actor) that corresponds to each character. The media application can therefore identify a connection between each line of subtitles and both the character and the subject (e.g., actor) that speaks that line. The process 400 then proceeds to step 522 (discussed in further detail below).

If, however, the media application determines that the subtitles are not connected to either the subjects or the characters played by those subjects in the media asset, the process proceeds to step 514. At step 514, the media application analyzes the media asset to map the subjects or characters present on screen with the information from the metadata of the media asset to identify links between the characters on screen and the subjects who play them. Similar mapping may be made between subjects or characters that are not actually present on the screen (i.e., a narrator or other speaker who is not shown), and the person who speaks.

At step 518, the media application analyzes the media asset to map the subjects' lines with the subtitles from the metadata of the media asset. This can include generating and/or modifying the metadata corresponding to the media asset to include links or connections between the lines spoken by the subject and the subtitles included in the metadata.

At step 520, the media application adds a subject ID to the subtitles in the metadata, so that the metadata now includes a connection between the subject, the character played by the subject, and the corresponding subtitles spoken by the subject or character. This may include generating or modifying the metadata to include the subject ID.

At step 522, the media application adds one or more voice fingerprints to the metadata. The media application may determine a LCPV for the media asset, and may store it in the metadata for the media asset. This step may include determining a LCPV for each subject, each actor, each spoken line of text, or some other segment of the audio of the media asset. The LCPVs can be stored as part of the metadata with time stamps or other identifiers that link the LCPVs to the corresponding subject, actor, spoken line of text, or other segment of the media asset.

At step 524, the media application then determines a LCPV for each subject in the media asset, and adds that LCPV to the metadata for the media asset. This may include combining the LCPVs for each line of subtitles spoken by a given subject, to determine a combined LCPV for the subject for this media asset. The process 500 then ends at step 526.

In some examples, the media application may enable a user to set a preferred action upon detection of a subject's voice fingerprint. For example, the user may set a default action such as activating subtitles, replacing with a non-accented or machine read voice, or some other action, in response to the media application detecting that a voice fingerprint of a subject is beyond a threshold distance from the user's language profile.

In some examples, the subtitle files associated with a media asset support actor identification in the transcript dialogues. Timed Text Markup Language (TTML) includes support for metadata markers such as <ttm:name>, <ttm:agent> and <ttm:actor> that can be used to identify an actor or a character in a dialogue. FIGS. 6 and 7 illustrate examples of how TTML can be used to support the features described herein.

FIGS. 6 and 7 show examples of TTML metadata for creating a relationship between a character and an actor (FIG. 6), and for identifying the source or origin of a line of dialogue (FIG. 7), in accordance with embodiments of the disclosure. FIG. 6 shows an example TTML partial file including a relationship between the character "James Bond" and the actor "Sean Connery." FIG. 7 shows a TTML partial file identifying that the agent "Bond" in the media asset is connected to the subtitle "A Martini, shaken, not stirred please" from the media asset.

Figure 8:
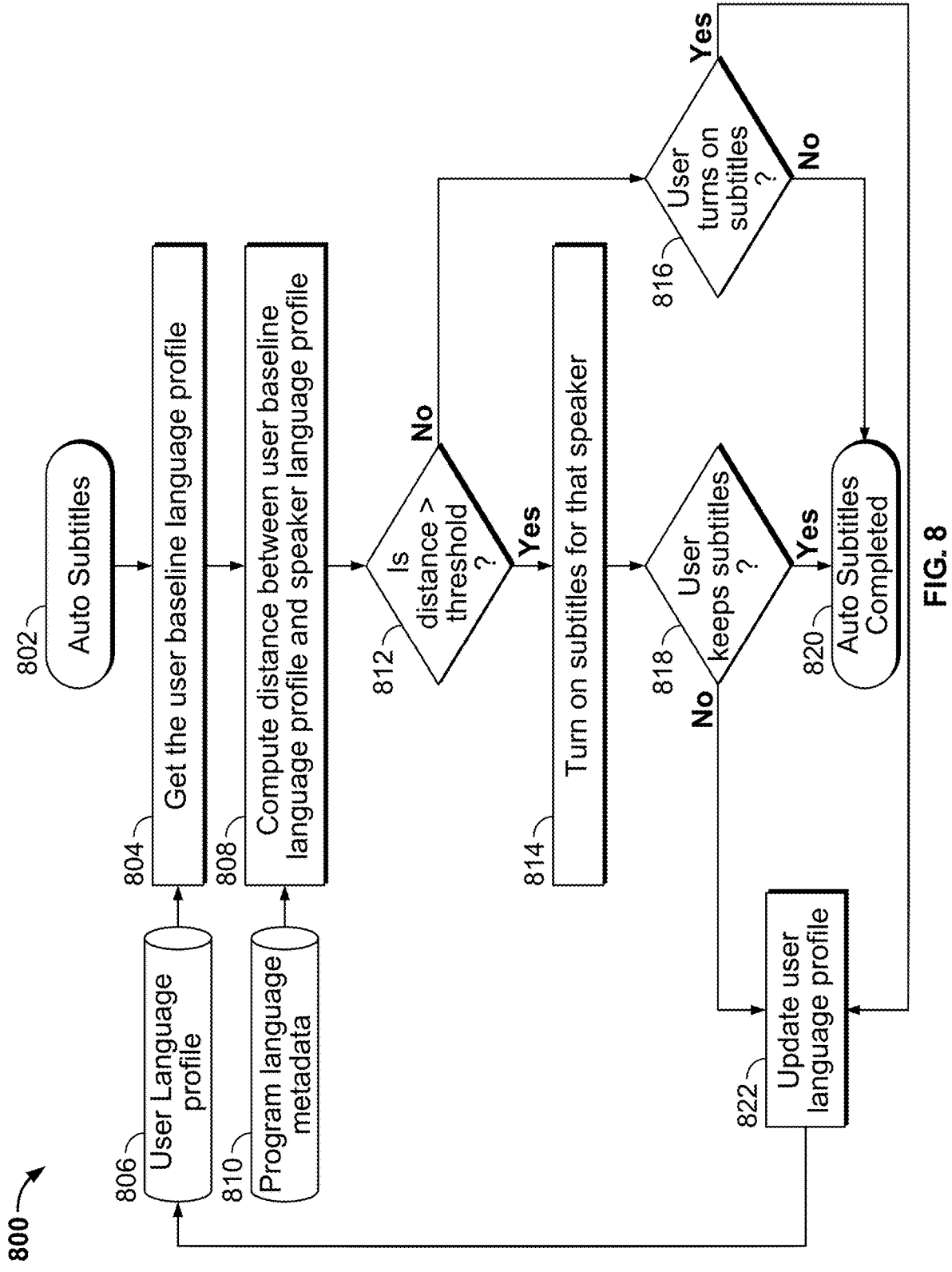
FIG. 8 shows a flowchart of example steps for automatically activating subtitles based on a language profile, in accordance with embodiments of the disclosure.

FIG. 8 is a flowchart of an illustrative process 800 for automatically activating subtitles for a media asset based on a language profile associated with the user, in accordance with some embodiments of the disclosure. As shown in FIG. 8, in accordance with some embodiments, the process 800 may be executed by processing circuitry 1406 of a client device (FIG. 14). It should be noted that process 800 or any step thereof could be performed on, or provided by, the systems of FIG. 13 or 14. Some steps of process 800 may be described as being performed by a media application. In addition, one or more steps of process 800 may be incorporated into or combined with one or more other steps described herein. For example, process 800 may be executed by control circuitry 1404 of FIG. 14 as instructed by a media application implemented on the client device 1400 in order to automatically activate subtitles based on a language profile of a user. Also, one or more steps of process 800 may be incorporated into or combined with one or more steps of any other process or embodiment, such as processes 400, 500, 900, and 1300 described with respect to FIGS. 4, 5, 9, and 13.

At step 802, the process for automatically activating subtitles begins. At step 804, the media application retrieves the user baseline language profile (i.e., LCPV) from the user profile stored at block 806.

At block 808, the media application determines a difference between the user LCPV and the speaker language profile from the media asset (e.g., the voice fingerprint for a subject in the media asset). This may include computing the distance using component subtraction, Euclidian distances, and/or cosine similarity as described above. The media application may retrieve the speaker language profile from the media asset metadata stored at block 810. In some examples, the media application may factor in a speed at which a subject speaks in determining the distance or difference between the LCPVs of the subject and the user, also referred to herein as the language profile proximity or distance between the language profiles of two participants. If the speed of the subject's speech is above a threshold speed, the media application in some examples may automatically activate subtitles. Or the media application may prompt a participant to activate subtitles, for instance when the user's LCPV indicates that the subject is speaking too quickly to be easily understood by the user. In some examples, the speed of the subject's speech may be used to modify or adjust the threshold used by the media application to automatically activate subtitles (or to automatically take some other action such as prompting the use for input).

At step 812, the media application determines whether the distance determined at step 808 is greater than a threshold distance. That is, the media application determines how close the speaker's speech is to the speech of the user profile, which may act as a proxy for how likely it is that the user will understand the speaker. If the distance is greater than the threshold, the media application responsively turns on subtitles for that speaker at step 814. When the media application activates or turns on subtitles, this can mean that the media application accesses a subtitle file (or other data structure) corresponding to the currently displayed media asset to identify subtitles that match a current time stamp of the media asset, in order to display the subtitles. In some examples, for example where a live media asset is presented, the media application may retrieve subtitles from a server, and/or may collect audio data from the live media asset to analyze and determine the appropriate subtitles to display. The analysis and determination of subtitles may be performed at a server remotely from the player presenting the media asset, or may be performed by the player itself.

However, if the distance is not greater than the threshold (i.e., the speaker LCPV is close to the user LCPV), then the process proceeds to step 816. At step 816, the media application determines whether an input to turn on the subtitles has been received. This may be received via a user interface, such as via a button selection on a remote control. If the media asset does not receive input to turn on subtitles, the process 800 ends at step 820.

However, even if the distance between the speaker LCPV and the user LCPV is not greater than the threshold (i.e., a NO at step 812), the user may still wish to have subtitles turned on. If the media application receives an input to turn on subtitles at step 816, the process proceeds to step 822 (discussed in further detail below).

If, however, the distance between the speaker LCPV and the user LCPV is determined to be greater than the threshold at step 812, and the media application activates subtitles for the speaker at step 814, the process 800 then includes the media application determining whether the user has kept the subtitles turned on or not at step 818. If the user keeps the subtitles turned on for the speaker at step 818, the process 800 ends at step 820.

However, if the media application turned on subtitles at step 814, and the user then turns off the subtitles at step 818, step 822 of the process 800 includes the media application updating the user language profile for the user, stored at block 806. Updating the user language profile at step 822 can include storing an indicator that subtitles should or should not be activated for a given subject, based on the actions taken by the user, and based on the determinations made by the media application at steps 816 and 818. The process 800 may continue until no further user input is received, and may end at step 820.

Figure 9:
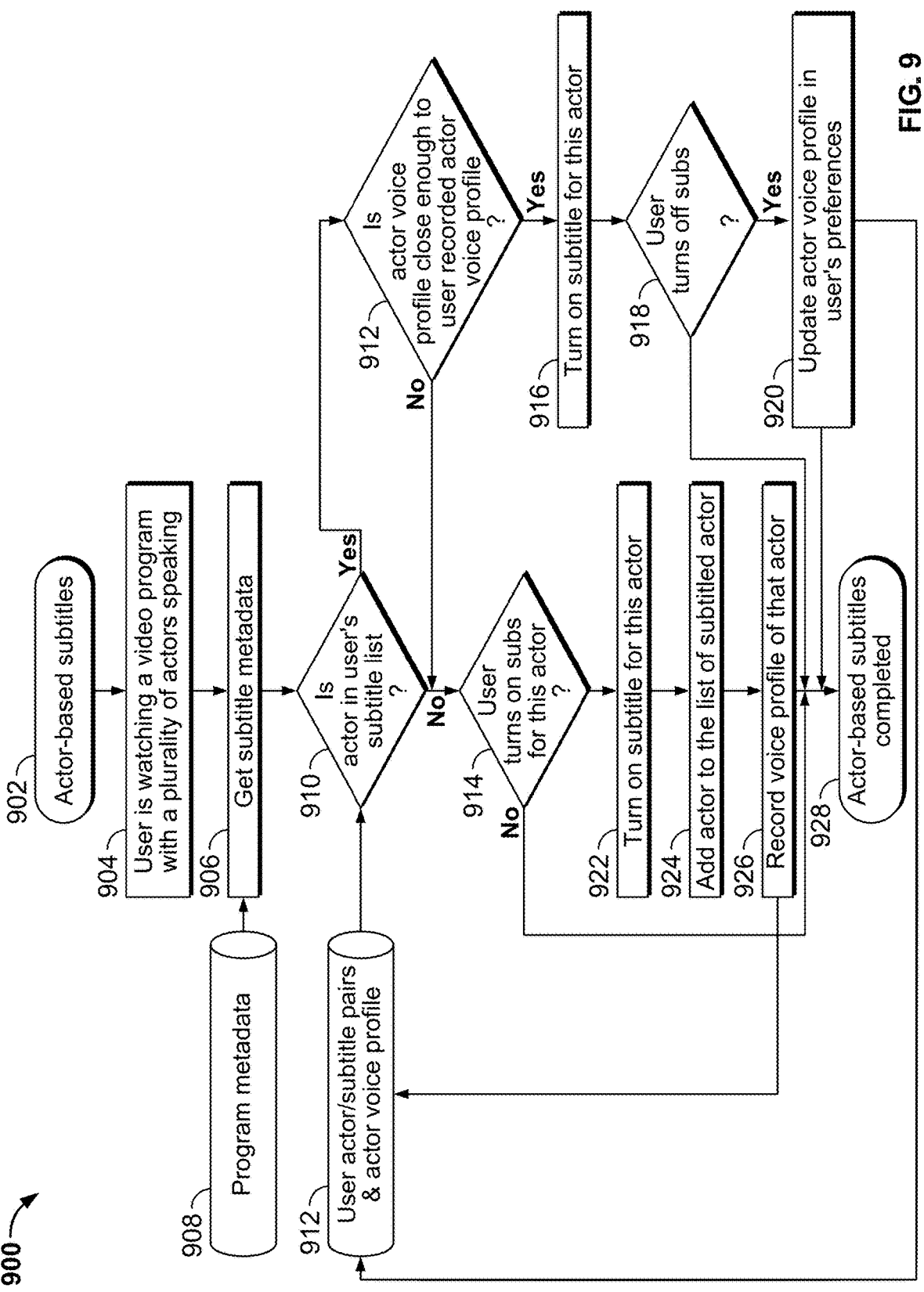
FIG. 9 shows a flowchart of examples steps for automatically activating subtitles for a subject in a media asset based on a voice fingerprint of the subject, in accordance with embodiments of the disclosure.

FIG. 9 is a flowchart of an illustrative process 900 for automatically activating subtitles for a subject in a media asset based on a voice fingerprint of the subject, in accordance with some embodiments of the disclosure. As shown in FIG. 9, in accordance with some embodiments, the process 900 may be executed by processing circuitry 1406 of a client device (FIG. 14). It should be noted that process 900 or any step thereof could be performed on, or provided by, the systems of FIG. 14 or 15. Some steps of process 900 may be described as being performed by a media application. In addition, one or more steps of process 900 may be incorporated into or combined with one or more other steps described herein. For example, process 900 may be executed by control circuitry 1404 of FIG. 14 as instructed by a media application implemented on the client device 1400 in order to automatically activate subtitles for a subject in a media asset based on a voice fingerprint of the subject. Also, one or more steps of process 900 may be incorporated into or combined with one or more steps of any other process or embodiment, such as processes 400, 500, 800, and 1300 described with respect to FIGS. 4, 5, 8, and 13.

At step 902, the process 900 for automatically activating subtitles based on the voice fingerprint of a subject (e.g., an actor) begins. At step 904, the media application begins presenting a media asset that includes one or more subjects speaking.

At step 906, the media application retrieves subtitle metadata for the media asset from the media asset metadata stored at block 908. The subtitle metadata may be retrieved from local storage, and/or may be received in segments as the media asset is retrieved from a remote server.

At step 910, the media application determines whether a subject from the media asset is included on a list of subjects for which the user has subtitles activated. The user profile may include a list of subjects for which subtitles should be activated. If the subject is on the user profile list of subjects for which subtitles should be activated, the media application determines at step 912 whether the subject's voice profile for the current media asset is sufficiently close to the user recorded actor voice profile. That is, the user profile may include (a) an entry for the subject indicating that subtitles for the subject should be turned on, and (b) a voice fingerprint or LCPV for the subject. If the voice fingerprint of the subject in the current media asset is sufficiently similar to the stored voice fingerprint (e.g., within a threshold distance), the media application may then activate subtitles for that subject at step 916.

However, if the subject is not included in the list of subjects for which subtitles should be activated in the user profile, or the subject's voice fingerprint for the current media asset is not sufficiently similar to the subject's voice fingerprint stored in the user profile, the process 900 proceeds to step 914.

At step 914, the media application determines whether an input has been received requesting that subtitles be activated for the subject. If the user profile does not include an entry indicating that subtitles should be activated for the subject, and the user has not input a request for subtitles to be activated for the subject, the process 900 may proceed to end at step 928.

If, however, the user profile does not include an entry indicating that subtitles should be activated for the subject, and the media application does receive an input requesting that subtitles be activated for the subject (e.g., as described with respect to FIG. 3), the media application may then activate the subtitles for the subject at step 922.

At step 924, because the media application has received a request to activate subtitles for the subject, the media application adds the subject to the list of subtitled actors in the user profile.

At step 926, the media application determines a voice fingerprint (e.g., LCPV) for the subject in the current media asset, and stores the voice fingerprint in the user profile at block 912. The process 900 may then end at block 928.

If subtitles were activated for the subject in the current media asset at step 916, the media application then determines whether a user input has been received to turn off subtitles for the subject. If no input is received, the process 800 may end at step 928.

If, however, after activating the subtitles for the subject at step 916 the media application receives a user input to turn off the subtitles at step 918, the media application may then update the user profile at step 920. In some examples, the media application may update the user profile to indicate that subtitles should be turned off for the subject. That is, the subject's LCPV for the current media asset may be stored, and an indication that subtitles are not needed for this combination of subject and LCPV may be stored as well. A subject may therefore have multiple entries in the user profile, and when a new media asset is presented including that subject, the voice profile of the subject in the new media asset may be compared to multiple existing entries, to determine whether the new media asset should have subtitles turned on for that subject or not. If the subject's voice fingerprint in the new media asset is closer to an entry for which subtitles were activated, then subtitles for the new media asset may be activated as well. But if the subject's voice fingerprint in the new media asset is closer to an entry for which subtitles are turned off, then subtitles for the new media asset may be turned off as well. In some examples, the media application may update the user profile by updating the LCPV values for the user. The media application updating the LCPV values to reflect the user choice (to either turn on or turn off subtitles) may have the benefit of enabling the LCPV values for the user to be interpreted again in another program without the user having to enable/disable subs again. In an example scenario, a user's French accent LCPV initial value is 0.5, and the user is presented with a program having a subject speaking French with a LCPV French accent value of 0.4 without subtitles. If the user decides to turn on subtitles for that subject, the user's LCPV French accent value may be updated to lower the value from 0.5 to 0.3 for example, so that a next time a subject speaks with a French accent above the 0.4 limit (in the same program or a different program), the media application may automatically enable subtitles based on the updated value. Process 900 may then end at step 928.

In some examples, one or more steps of process 900 may be performed by the media application prior to presentation of the media asset to the user. The media application may predetermine which subject(s) should have subtitles activated prior to presentation of the media asset to the user.

In some examples, the features and principles disclosed herein may apply to media assets that are streamed for presentation to a user, as well as for media assets that are downloaded or recorded for later presentation. The media application may perform the functions disclosed herein to determine whether subtitles should be activated or not for various media assets and subjects, and store that information in the metadata associated with various media assets. The subtitle side-car file associated with a media asset downloaded or recorded may be generated by the media application based on the user profile, language profile, or LCPV of the user requesting the download or recording, or of a user profile for which the recording or downloading is being performed (if not the same as the requesting user profile). In some examples, the subtitle file may be referenced in the manifest for a media asset. The subtitle file may be separate from the manifest, so in examples where there are different subtitle files for different viewers, then the media application may be configured to update the manifest (or a portion of the manifest) that references the corresponding subtitle file. In situations where more than one user may watch a given media asset, the media application can prepare several subtitle side-car files for each possible user. For example, if John watches the same TV show as Lisa, and that TV show was recorded, the media platform may present an option to "play for John," "play for Lisa," or "play for all." The media application may also present various options prior to recording, such as "record for John," "record for Lisa," or "record for all." The media application can then present the media asset with subtitles activated for the subjects in the media asset based on the user profile(s) associated with John and Lisa.

In some examples, the media application may enable one user to record or download a media asset for another user. The media application may prepare the media asset for download and/or recording based on the user profile of the user for whom the recording was made. For example, the media application may determine one or more subjects to have their voices replaced (e.g., to remove the subject's accent) based on the user profile of the person for whom the recording was made. In other examples, the media application may store subtitles for one or more subjects, and/or activate the subtitles for the one or more subjects, based on the user profile of the person for whom the recording was made.

In some examples, the features described above with respect to downloading or recording media assets for later presentation may be applied to other aspects of personalizing the display of media assets, metadata, and/or other content. The media application may personalize the metadata associated with a media asset based on a user profile, wherein the metadata may include subtitles (as discussed above), as well as digital offers, interactive overlays, advertisements, and more. The media application may personalize the media asset based on the user profile selected by a requestor of the download and/or recording. For example, John may prefer Coke while Lisa prefers Pepsi. When a media asset is recorded for later presentation, the media application may insert the corresponding soft drink as an overlay in a scene of the media asset based on the specific user that the media asset is being presented to (e.g., "play for John" or "play for Lisa").

The media application may enable a "record for user X" option that enables the DVR service and the Advertisement Decisioning Server (ADS) to select and record or download the targeted ads that the user would have seen if they were watching a live stream of the same media asset. The media application may also personalize offers and interactive overlays. In some examples, the media application may personalize based on multiple user profiles (e.g., determine appropriate subtitle activation, advertisements, etc., based on multiple user profiles). The media application may determine one or more overlapping interests between multiple users, and may select an advertisement based on the overlapping interests. The media application may also activate all applicable subtitles for multiple users (e.g., where user A requests subtitles for actor 1, and user B requires subtitles for actor 2, the media application may activate subtitles for both actor 1 and actor 2).

In some embodiments, where one or more users are viewing a media asset on a primary device, the media application may present subtitles via corresponding secondary device(s), such as a smartphone, a pair of AR glasses, or some other device communicatively coupled to the primary device for the purpose of displaying subtitles.

Figure 10:
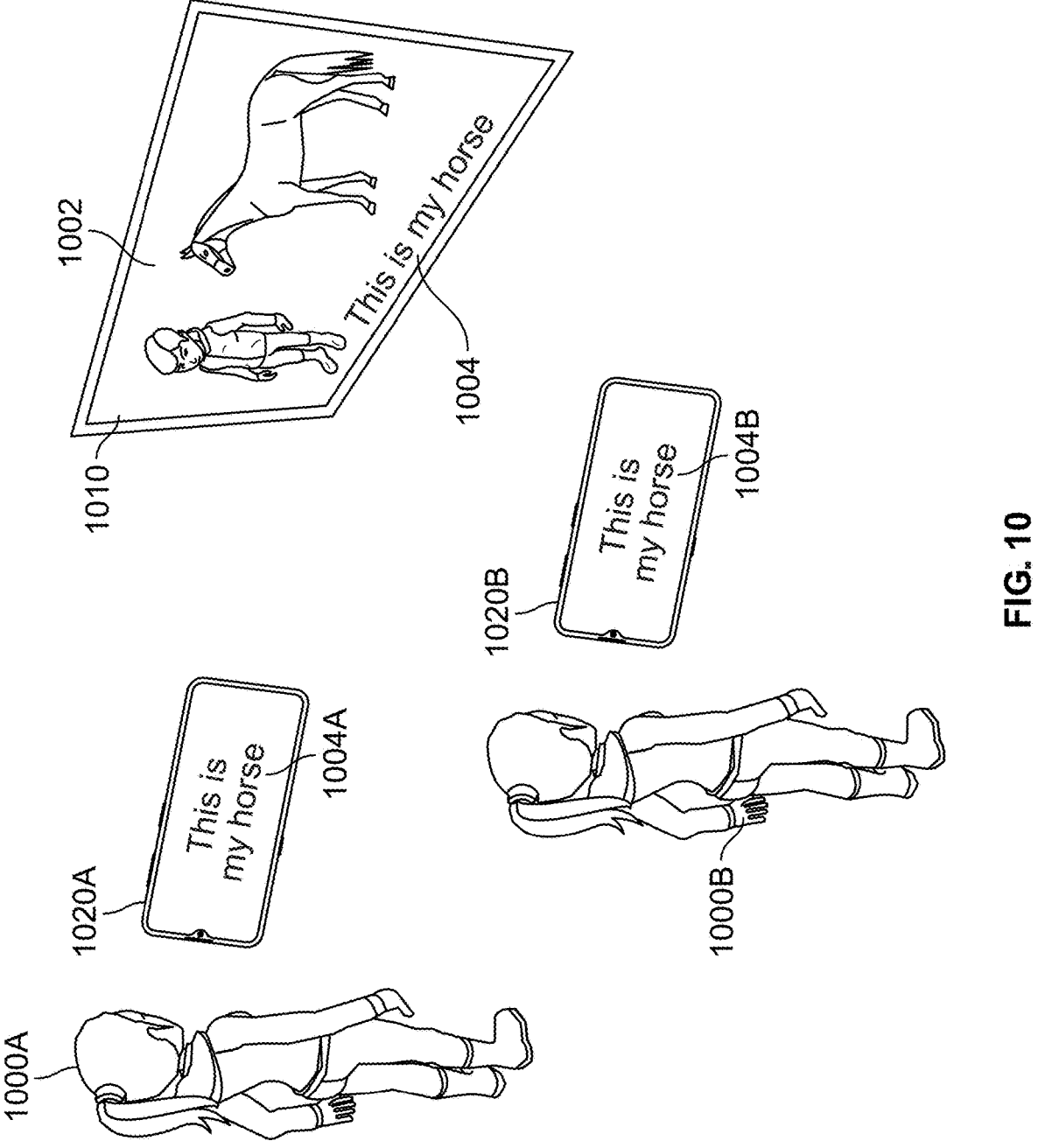
FIG. 10 shows an example scenario in which a media asset is presented on a first device while subtitles are activated on a second device, in accordance with embodiments of the disclosure.

FIG. 10 shows a display of a media asset 1002 presented on a primary device 1010. Subtitles 1004 are also displayed on the primary device 1010. FIG. 10 also shows a first user 1000A and a second user 1000B, each with a corresponding secondary device 1020A or 1020B, displaying corresponding subtitles 1004A and 1004B. If all viewers of the media asset 1002 receive their subtitles on their corresponding secondary device (e.g., devices 1020A and 1020B), then the media application may disable subtitles 1004 on the primary display 1010. However, if at least one viewer receives their corresponding subtitles on the primary display 1010, the media application may continue to display the subtitles 1004. Additionally, if the media application displays subtitles 1004 on the primary display, and one or more viewers receive their subtitles on corresponding AR glasses, the AR glasses may overlay the subtitles 1004 displayed on the primary display 1010 with a solid background when there are interfering subtitles between the primary device 1010 and the corresponding secondary device 1020A or 1020B. If more than one user watches the media asset on the primary display, then the subtitles 1004 on the primary display may be a union of all the individual personalized subtitles of these users.

In some examples, subtitles may be displayed on the primary device 1010, the secondary device 1020A-B, and/or a combination of both. Where multiple users are viewing the media asset, the subtitles presented via each secondary device may be tailored to the corresponding user individually (i.e., user 1000A has subtitles activated based on her user profile displayed on secondary device 1020A, while user 1000B has subtitles activated based on her user profile and displayed on secondary device 1020B). The primary device 1010 may present no subtitles (for example when subtitles are displayed on devices 1020A and 1020B), may show subtitles corresponding to user 1000A, user 1000B, or a combination of both users 1000A and 1000B.

Figure 11:
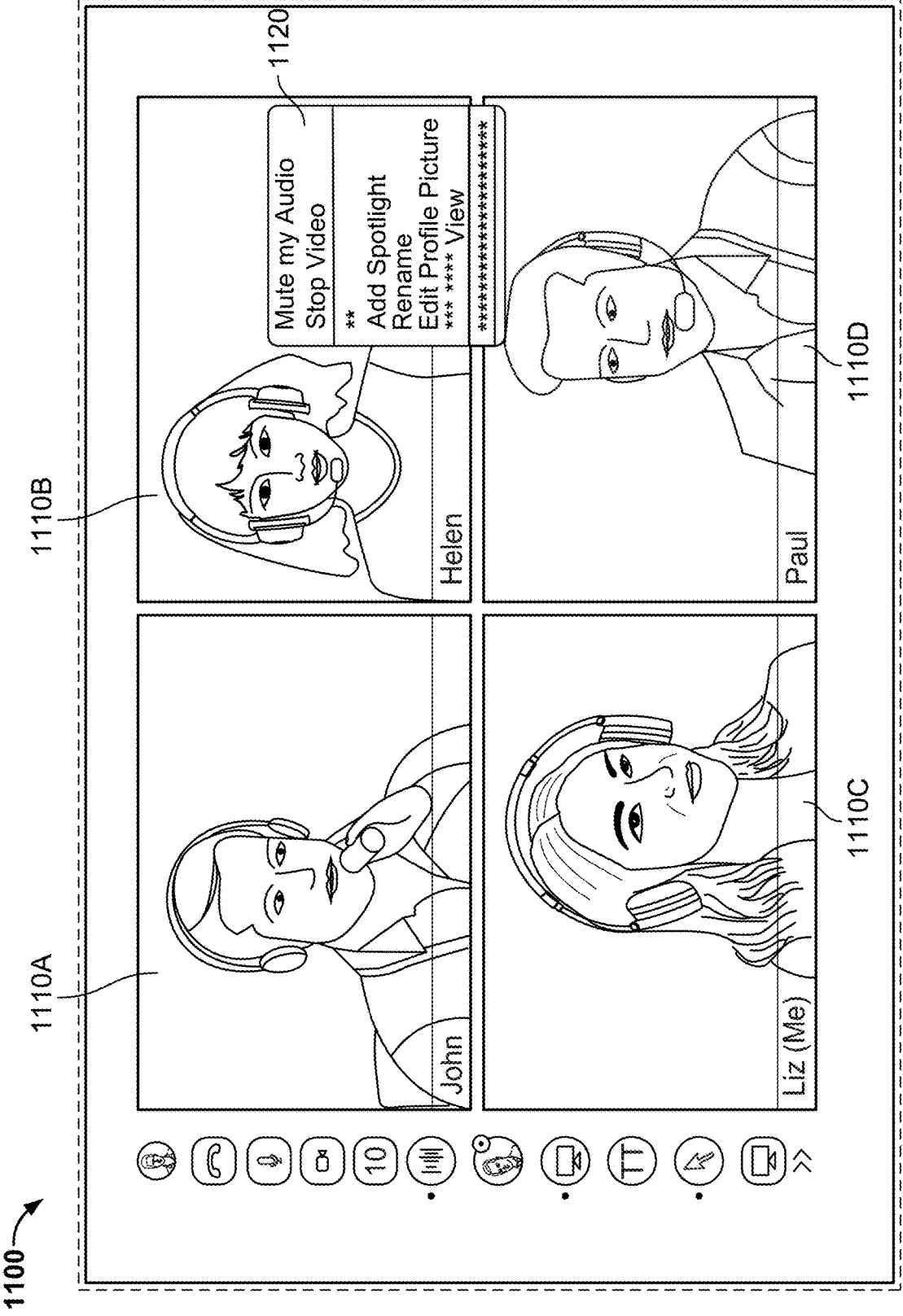
FIG. 11 shows an example user interface enabling activation of subtitles on a per-participant basis in a video conference, in accordance with embodiments of the present disclosure.
Figure 12:
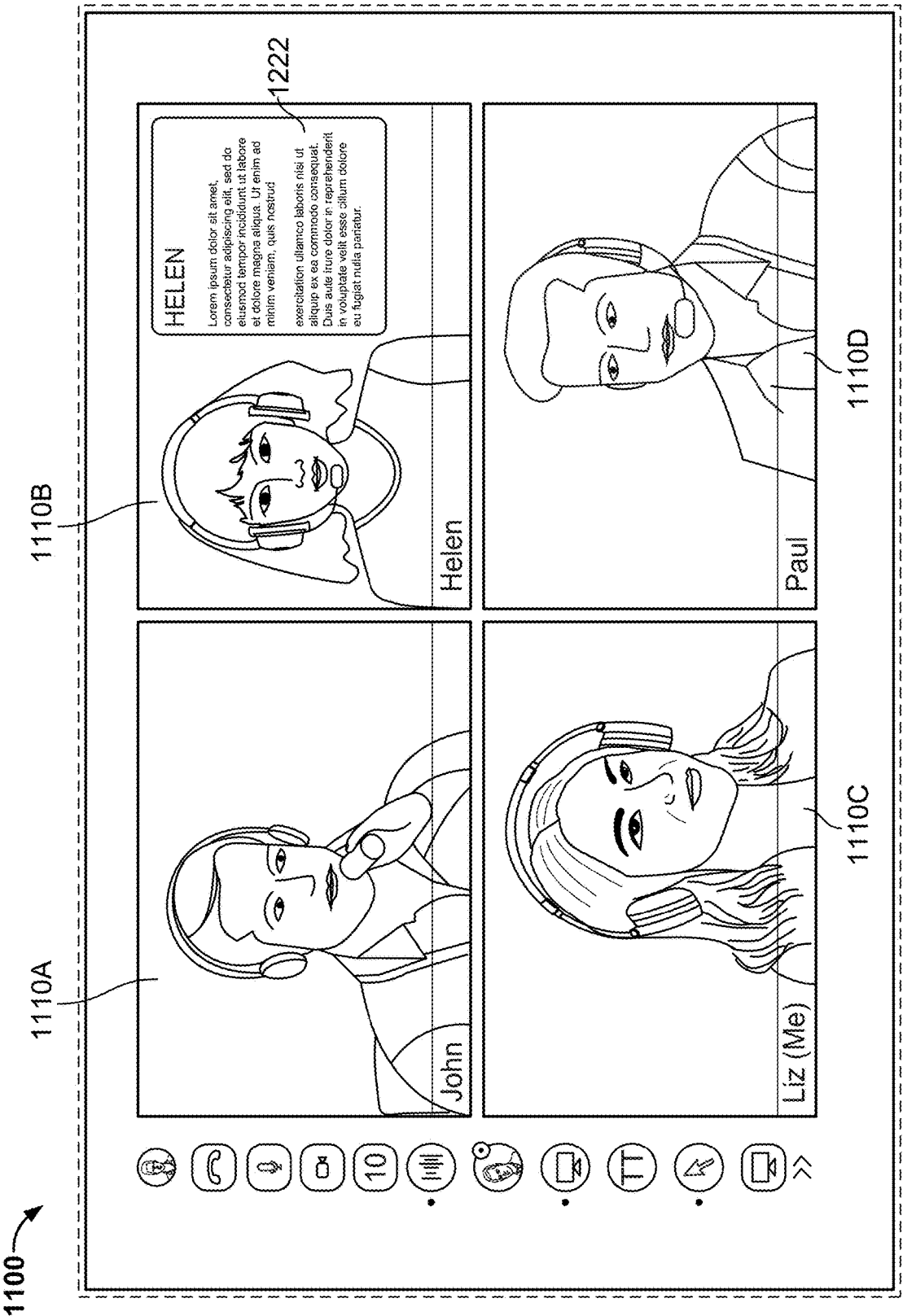
FIG. 12 shows an example user interface after activation of subtitles for a participant in a video conference, in accordance with embodiments of the present disclosure.
Figure 13:
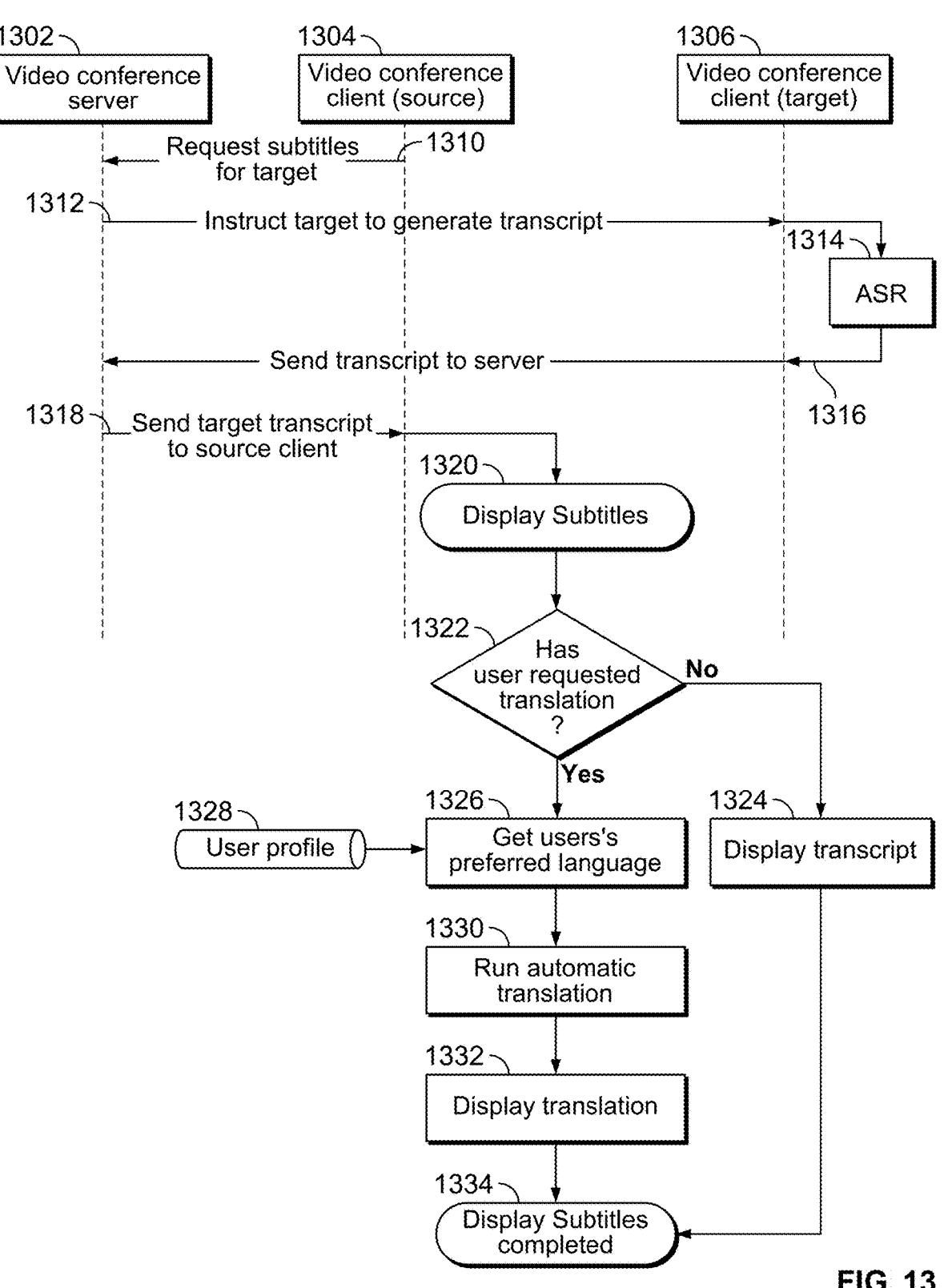
FIG. 13 shows an example sequence diagram illustrating how subtitles are activated for a participant in a video conference, in accordance with embodiments of the present disclosure.
Figures 14, 15:
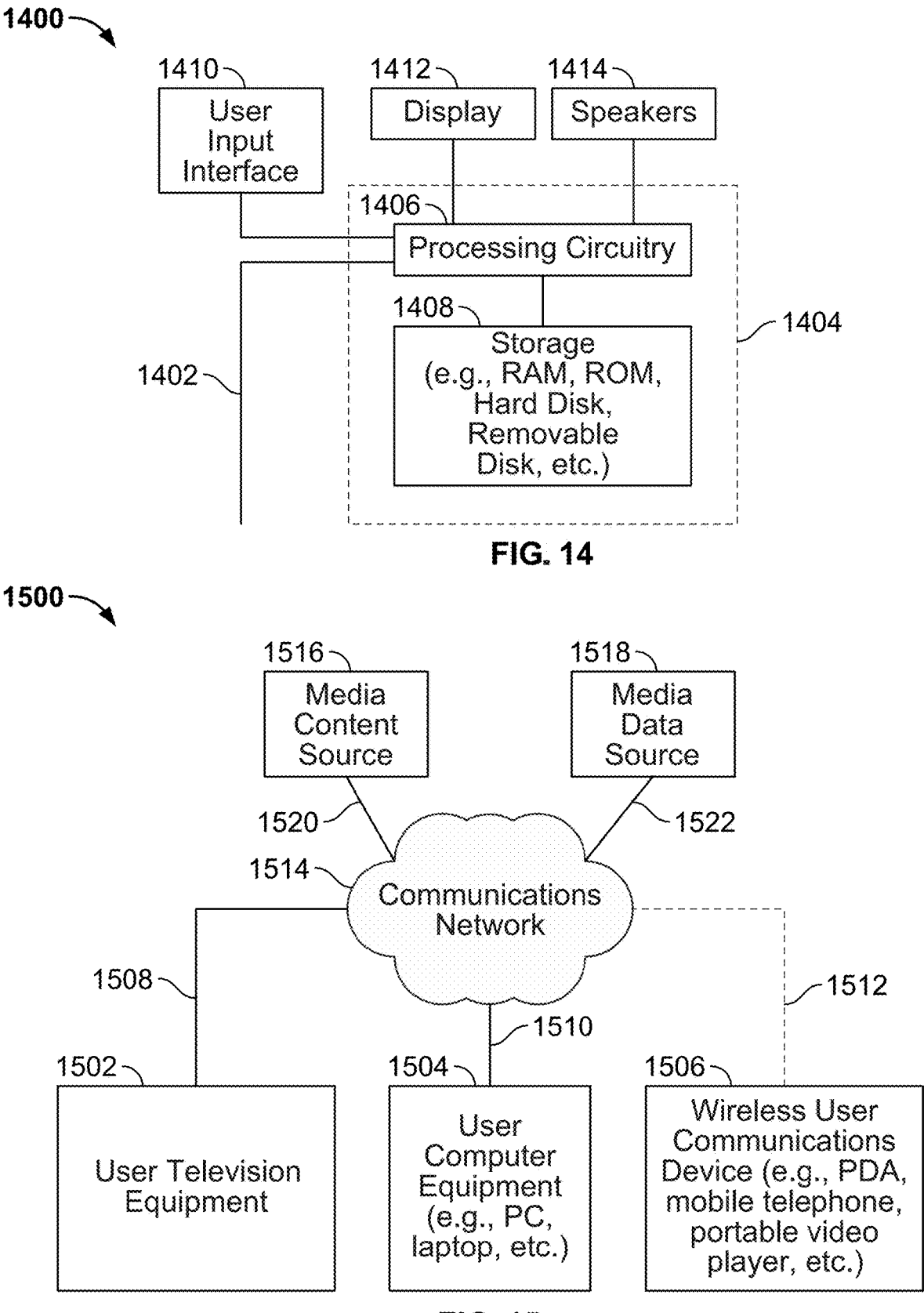
FIG. 14 is a block diagram of an illustrative user equipment device, in accordance with embodiments of the disclosure.
FIG. 15 is a block diagram of an illustrative media system, in accordance with embodiments of the disclosure.

FIGS. 11, 12, and 13 illustrate an example embodiment of the features described herein with respect to a video conferencing environment. In a video conference, a participant may have a hard time understanding another participant. In the current state of video conferencing platforms, it may be difficult or impossible to activate subtitles for an individual participant. Additionally, to activate subtitles a user may be required to request that the organizer of the video conference turn them on. A participant may hesitate to ask for subtitles to be turned on as it could be considered either rude if one or several other participants have a discernable accent or if their skill in the language spoken in the video conference is lower than average. Similarly, if the requestor is the one with poor language skill, they will also hesitate to ask for subtitles to be turned on as may not want to expose themselves.

In some examples, a source participant in a video conference can enable subtitles for another target participant. The request to activate subtitles may be processed by a central server (in the case of a centralized video conferencing system) or by the video conference client of the target participant (in the case of a peer-to-peer video conferencing system).

FIG. 11 illustrates an example user interface 1100 for enabling subtitles for a target participant of a video conference. FIG. 11 illustrates four participants 1110A-D, and a UI element 1120 corresponding to user 1110B. In this example, the source participant 1110A has requested that subtitles be activated for the target participant 1110B by interacting with the UI element 1120. The media application may display the UI element 1120 and the corresponding options to activate or deactivate subtitles for the target participant.

FIG. 12 illustrates the user interface 1100 after the subtitles 1222 have been activated for the target participant 1110B. The subtitles 1222 can be displayed in various manners, including as illustrated in FIG. 12 in a transcript fashion. The target participant 1110B may be notified, or may not be notified that subtitles have been activated. This may enable the media application to preserve the privacy of the source participant requesting that the subtitles be activated.

In some examples, the media application (e.g., either the server or target client), may generate the subtitles in real-time using various automatic speech recognition (ASR) methods. The media application may only transfer the subtitles to a source participant if the source participant has requested subtitles be activated. In other examples, the subtitles may be generated for a target participant only when at least one of the other participants requests that they be activated. In still other examples, the subtitles may be translated into the source participant's default language (which may be a part of the source participants global settings).

FIG. 13 is a flowchart of an illustrative sequence diagram for remote subtitle control in a video conferencing environment, in accordance with some embodiments of the disclosure. As shown in FIG. 13, in accordance with some embodiments, a process 1300 may be executed by processing circuitry 1406 of a client device (FIG. 14). It should be noted that process 1300 or any step thereof could be performed on, or provided by, the systems of FIG. 14 or 15. Some steps of process 1300 may be described as being performed by a media application. In addition, one or more steps of process 1300 may be incorporated into or combined with one or more other steps described herein. For example, process 1300 may be executed by control circuitry 1404 of FIG. 14 as instructed by a media application implemented on the client device 1400 in order to control subtitles in a video conferencing environment. Also, one or more steps of process 1300 may be incorporated into or combined with one or more steps of any other process or embodiment, such as processes 400, 500, 800, and 900 described with respect to FIGS. 4, 5, 8, and 9.

FIG. 13 illustrates three devices, a video conferencing server 1302, a first video conferencing client 1304 (i.e., the source participant), and a second video conferencing client 1306 (i.e., the target participant). The scenario shown in FIG. 13 illustrates the series of actions that occur when the source participant of the first video conferencing client 1302 requests subtitles be displayed for the target participant using the second video conferencing client 1306.

At step 1310, the media application (which may also be referred to as a video conferencing application) receives the request to activate subtitles for a target participant from the source participant. This request may be received via a user interface, as shown in FIG. 11.

At step 1312, video conferencing server 1302 instructs the target participant client device 1306 to generate a transcript of the audio input at the target participant's client device. This can include transmitting instructions for the target participant client device 1306 to begin recording and/or performing a speech recognition technique on any audio input to the device 1306. In some examples, this may only occur if the target participant has allowed for speech recognition to be performed, such as by selecting an option in a user profile to enable subtitles to be generated.

At step 1314, the target client device uses one or more automatic speech recognition (ASR) techniques to generate a transcript of the input audio at the target video conferencing client 1306. Any suitable ASR technique may be used to convert the input audio at the device 1306 into a transcript of text.

At step 1316, the generated transcript is transmitted to the video conferencing server 1302. In some examples, the transcript may instead be generated at the video conferencing server after the audio is transmitted to the server. And at step 1318, the generated transcript is transmitted to the requesting client device 1304.

At step 1320, the media application begins the process of displaying the subtitles for the target participant to the source participant. This can include overlaying the transcript on the displayed video, and/or overlaying a portion of the transcript. In some examples, the player for each participant may receive an instruction from the video conferencing server (and/or a speech analysis module of the server) to turn subtitles on or off for one or more other participants. At step 1322, the media application determines whether the source participant has requested a translation of the subtitles for the target participant in addition to requesting that subtitles be activated in the first place. If no translation was requested, the media application presents the transcript at step 1324, and the process ends at step 1334.

If, however, a translation of the subtitles was requested at step 1322, the media application retrieves the source participant's preferred language at step 1326 from a stored user profile in block 1328. The media application then translates the transcript at step 1330 into the source participant's preferred language. The media application then presents the translated transcript at step 1332, and the process ends at step 1334.

It should be appreciated that the features and functions described above with respect to FIGS. 1-10 also apply to the embodiment described above relating to a video conferencing environment. For example, a source participant may select or input a baseline language, and the media application may update or modify that language based on the user's input speech. Additionally, the media application may determine a LCPV for the user, and store that LCPV in the corresponding user profile. The media application may continuously or at regular or irregular intervals update the user's LCPV based on speech from the user during video conferencing sessions.

In some examples, the media application may run an accent detection analysis in real time, and/or build an LCPV for each participant, while each participant in the video conference is speaking, and may determine a distance between each of the participants language profiles (e.g., using component subtraction, Euclidian distances, or cosine similarity as described above). If the distance (i.e., LCPV comparison between a user and one or more other participants) exceeds a threshold, the media application may automatically begin transcribing the audio into a transcript, and/or may automatically enable captioning for that participant for this user.

In some examples, the media application may enable a source participant to disable the subtitles for a target participant. The media application may use the information that the source participant has disabled subtitling for the target participant to recompute the language profile of the source participant so that in subsequent meetings subtitles are not automatically activated for target participants having similar language profiles.

In some examples, the media application may factor in a speed at which a target participant speaks in determining the language profile proximity (e.g., distance between the language profiles of two participants). If the speed of the target participant's speech is above a threshold speed, the media application in some examples may automatically activate subtitles. Or the media application may prompt a participant to activate subtitles, for instance when the participant's LCPV indicates that the target participant is speaking too quickly to be easily understood by the participant. In some examples, the speed of the target participant's speech may be used to modify or adjust the threshold used by the media application to automatically activate subtitles.

In some examples, multiple participants may speak over each other or may cause crosstalk. This often makes it difficult for participants to understand what was said. In these cases, the media application may detect crosstalk (e.g., two or more people speaking simultaneously) using a variety of techniques. In some examples, the media application may compare time stamps associated with input audio from multiple participants, may detect simultaneous activation of multiple microphones, may use ASR technique(s) to identify speech from multiple participants to determine that they are speaking at the same time (e.g., as opposed to background noise), may include one or more analysis models or other mechanisms for analysis of input audio to identify when multiple participants are speaking at the same time, and more. In response to detecting crosstalk, the media application may automatically activate subtitles for one or more participants (including one or more of the participants who created the crosstalk). This may eliminate the need for the participants to repeat what was said during the crosstalk.

In some examples, subtitles transcribed from video conference may be optionally displayed when a participant becomes distracted and misses a question. The media application may detect that a participant is distracted and is the target of a question (e.g., using the camera and/or image analysis), and may automatically present a transcript of a question to help to recollect the attention of the participant who was asked the question.

Users may access content (media assets) and the media application described herein from one or more of their user equipment devices. FIG. 14 shows a generalized embodiment of illustrative user equipment device 1400. More specific implementations of user equipment devices are discussed below in connection with FIG. 15. User equipment device 1400 may receive content and data via input/output (hereinafter "I/O") path 1402. I/O path 1402 may provide content (e.g., media assets, metadata, broadcast programming, on-demand programming, Internet content, content available over a local area network (LAN) or wide area network (WAN), and/or other content) and data to control circuitry 1404, which includes processing circuitry 1406 and storage 1408. Control circuitry 1404 may be used to send and receive commands, requests, and other suitable data using I/O path 1402. I/O path 1402 may connect control circuitry 1404 (and specifically processing circuitry 1406) to one or more communications paths (described below). I/O functions may be provided by one or more of these communications paths, but are shown as a single path in FIG. 14 to avoid overcomplicating the drawing.

Control circuitry 1404 may be based on any suitable processing circuitry such as processing circuitry 1406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1404 executes instructions for a media application stored in memory (i.e., storage 1408). Specifically, control circuitry 1404 may be instructed by the media application to perform the functions discussed in this disclosure. For example, the media application may provide instructions to control circuitry 1404 to automatically activate and/or deactivate subtitles for various media assets. In some implementations, any action performed by control circuitry 1404 may be based on instructions received from the media application.

In client-server based embodiments, control circuitry 1404 may include communications circuitry suitable for communicating with a media application server or other networks or servers. The instructions for carrying out the above mentioned functionality may be stored on the media application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 15). In addition, communications circuitry may include circuitry that enables peer-to-peer communication of user equipment devices, or communication of user equipment devices in locations remote from each other (described in more detail below).

Memory may be an electronic storage device provided as storage 1408 that is part of control circuitry 1404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1408 may be used to store various types of content described herein as well as media asset and metadata described above. Nonvolatile memory may also be used (e.g., to launch a boot-up routine and other instructions). Cloud-based storage, described in relation to FIG. 15, may be used to supplement storage 1408 or instead of storage 1408.

Control circuitry 1404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1404 may also include scaler circuitry for upconverting and downconverting content into the preferred output format of the user equipment 1400. Circuitry 1404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive media data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1408 is provided as a separate device from user equipment 1400, the tuning and encoding circuitry (including multiple tuners) may be associated with storage 1408.

A user may send instructions to control circuitry 1404 using user input interface 1410. User input interface 1410 may be any suitable user interface, such as a remote control, mouse, trackball, keypad, keyboard, touch screen, touchpad, stylus input, joystick, voice recognition interface, or other user input interfaces. Display 1412 may be provided as a stand-alone device or integrated with other elements of user equipment device 1400. For example, display 1412 may be a touchscreen or touch-sensitive display. In such circumstances, user input interface 1410 may be integrated with or combined with display 1412. Display 1412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1412 may be HDTV-capable. In some embodiments, display 1412 may be a 3D display, and the media application and any suitable content may be displayed in 3D. A video card or graphics card may generate the output to the display 1412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1404. The video card may be integrated with the control circuitry 1404. Speakers 1414 may be provided as integrated with other elements of user equipment device 1400 or may be stand-alone units. The audio component of videos and other content displayed on display 1412 may be played through speakers 1414. In some embodiments, the audio may be distributed to a receiver (not shown), which processes and outputs the audio via speakers 1414.

The media application may be implemented using any suitable architecture. For example, it may be a stand-alone application wholly-implemented on user equipment device 1400. In such an approach, instructions of the media application are stored locally (e.g., in storage 1408), and data for use by the media application is downloaded on a periodic basis (e.g., from an out-of-band feed, from an Internet resource, or using another suitable approach). Control circuitry 1404 may retrieve instructions of the application from storage 1408 and process the instructions to carry out any of the functions discussed herein. Based on the processed instructions, control circuitry 1404 may determine what action to perform when input is received from input interface 1410. For example, movement of a cursor on a display up/down may be indicated by the processed instructions when input interface 1410 indicates that an up/down button was selected.

In some embodiments, the media application is a client-server based application. Data for use by a thick or thin client implemented on user equipment device 1400 is retrieved on-demand by issuing requests to a server remote to the user equipment device 1400. In one example of a client-server based media application, control circuitry 1404 runs a web browser that interprets web pages provided by a remote server. For example, the remote server may store the instructions for the application in a storage device. The remote server may process the stored instructions using circuitry (e.g., control circuitry 1404) and make the various determinations and carry out various functions described herein. The client device may receive data from the remote server and may display that information locally on equipment device 1400. This way, the processing of the instructions is performed remotely by the server while the resulting information is provided locally on equipment device 1400. Equipment device 1400 may receive inputs from the user via input interface 1410 and transmit those inputs to the remote server for processing and generating the corresponding displays. For example, equipment device 1400 may transmit a communication to the remote server indicating that a request to activate subtitles has been selected via input interface 1410. The remote server may process instructions in accordance with that input and generate a corresponding display (e.g., a display that includes the requested subtitles). The generated display is then transmitted to equipment device 1400 for presentation to the user.

In some embodiments, the media application is downloaded and interpreted or otherwise run by an interpreter or virtual machine (run by control circuitry 1404). In some embodiments, the media application may be encoded in the ETV Binary Interchange Format (EBIF), received by control circuitry 1404 as part of a suitable feed, and interpreted by a user agent running on control circuitry 1404. For example, the media application may be an EBIF application. In some embodiments, the media application may be defined by a series of JAVA-based files that are received and run by a local virtual machine or other suitable middleware executed by control circuitry 1404. In some of such embodiments (e.g., those employing MPEG-2 or other digital media encoding schemes), the media application may be, for example, encoded and transmitted in an MPEG-2 object carousel with the MPEG audio and video packets of a program.

User equipment device 1400 of FIG. 14 can be implemented in system 1500 of FIG. 15 as user television equipment 1502, user computer equipment 1504, wireless user communications device 1506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as a standalone device or may be part of a network of devices. Various network configurations of devices may be implemented and are discussed in more detail below.

A user equipment device utilizing at least some of the system features described above in connection with FIG. 14 may not be classified solely as user television equipment 1502, user computer equipment 1504, or a wireless user communications device 1506. For example, user television equipment 1502 may, like some user computer equipment 1504, be Internet-enabled allowing for access to Internet content, while user computer equipment 1504 may, like some television equipment 1502, include a tuner allowing for access to television programming. The media application may have the same layout on various types of user equipment or may be tailored to the display capabilities of the user equipment. For example, on user computer equipment 1504, the media application may be provided as a web site accessed by a web browser. In another example, the media application may be scaled down for wireless user communications devices 1506.

In system 1500, there is typically more than one of each type of user equipment device but only one of each is shown in FIG. 15 to avoid overcomplicating the drawing. In addition, each user may utilize more than one type of user equipment device and also more than one of each type of user equipment device.

In some embodiments, a user equipment device (e.g., user television equipment 1502, user computer equipment 1504, wireless user communications device 1506) may be referred to as a "second screen device" or "secondary device." For example, a second screen device may supplement content presented on a first user equipment device. The content presented on the second screen device may be any suitable content that supplements the content presented on the first device. In some embodiments, the second screen device provides an interface for displaying subtitles, or adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the media application utilizes to make programming recommendations, display preferences, and other desirable media settings. For example, if a user sets a channel as a favorite on, for example, the web site www-.Tivo.com on their personal computer at their office, the same channel will appear as a favorite on the user's in-home devices (e.g., user television equipment and user computer equipment) as well as the user's mobile devices, if desired. Therefore, changes made on one user equipment device can change the experience on another user equipment device, regardless of whether they are the same or a different type of user equipment device. In addition, the changes made may be based on settings input by a user, as well as user activity monitored by the media application.

The user equipment devices may be coupled to communications network 1514. Namely, user television equipment 1502, user computer equipment 1504, and wireless user communications device 1506 are coupled to communications network 1514 via communications paths 1508, 1510, and 1512, respectively. Communications network 1514 may be one or more networks including the Internet, a mobile phone network, mobile voice or data network (e.g., a 4G, 5G, 6G, or LTE network), cable network, public switched telephone network, or other types of communications network or combinations of communications networks. Paths 1508, 1510, and 1512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1512 is drawn with dotted lines to indicate that in the exemplary embodiment shown in FIG. 15 it is a wireless path and paths 1508 and 1510 are drawn as solid lines to indicate they are wired paths (although these paths may be wireless paths, if desired). Communications with the user equipment devices may be provided by one or more of these communications paths, but are shown as a single path in FIG. 15 to avoid overcomplicating the drawing.

Although communications paths are not drawn between user equipment devices, these devices may communicate directly with each other via communication paths, such as those described above in connection with paths 1508, 1510, and 1512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1514.

System 1500 includes content source 1516 and media data source 1518 coupled to communications network 1514 via communication paths 1520 and 1522, respectively. Paths 1520 and 1522 may include any of the communication paths described above in connection with paths 1508, 1510, and 1512. Communications with the content source 1516 and media data source 1518 may be exchanged over one or more communications paths, but are shown as a single path in FIG. 15 to avoid overcomplicating the drawing. In addition, there may be more than one of each of content source 1516 and media data source 1518, but only one of each is shown in FIG. 15 to avoid overcomplicating the drawing. (The different types of each of these sources are discussed below.) If desired, content source 1516 and media data source 1518 may be integrated as one source device. Although communications between sources 1516 and 1518 with user equipment devices 1502, 1504, and 1506 are shown as through communications network 1514, in some embodiments, sources 1516 and 1518 may communicate directly with user equipment devices 1502, 1504, and 1506 via communication paths (not shown) such as those described above in connection with paths 1508, 1510, and 1512.

Content source 1516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1516 may be the originator of content (e.g., a television broadcaster, a Webcast provider, etc.) or may not be the originator of content (e.g., an on-demand content provider, an Internet provider of content of broadcast programs for downloading, etc.). Content source 1516 may include cable sources, satellite providers, on-demand providers, Internet providers, over-the-top content providers, or other providers of content. Content source 1516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media data source 1518 may provide media data, such as various information described above regarding subtitles, voice fingerprints, LCPVs, and more. Media data may be provided to the user equipment devices using any suitable approach. In some embodiments, the media application may be a stand-alone interactive television program guide that receives program guide data via a data feed (e.g., a continuous feed or trickle feed). Program schedule data and other data may be provided to the user equipment on a television channel sideband, using an in-band digital signal, using an out-of-band digital signal, or by any other suitable data transmission technique. Program schedule data and other media data may be provided to user equipment on multiple analog or digital television channels.

In some embodiments, data from media data source 1518 may be provided to users' equipment using a client-server approach. For example, a user equipment device may pull media data from a server, or a server may push media data to a user equipment device. In some embodiments, a media application client residing on the user's equipment may initiate sessions with source 1518 to obtain data when needed, e.g., when the data is out of date or when the user equipment device receives a request from the user to receive data. Media data may be provided to the user equipment with any suitable frequency (e.g., continuously, daily, a user-specified period of time, a system-specified period of time, in response to a request from user equipment, etc.). Media data source 1518 may provide user equipment devices 1502, 1504, and 1506 the media application itself or software updates for the media application.

In some embodiments, the media data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year.

Media applications may be, for example, stand-alone applications implemented on user equipment devices. For example, the media application may be implemented as software or a set of executable instructions which may be stored in storage 1408, and executed by control circuitry 1404 of a user equipment device 1400. In some embodiments, media applications may be client-server applications where only a client application resides on the user equipment device, and server application resides on a remote server. For example, media applications may be implemented partially as a client application on control circuitry 1404 of user equipment device 1400 and partially on a remote server as a server application (e.g., media data source 1518) running on control circuitry of the remote server. When executed by control circuitry of the remote server (such as media data source 1518), the media application may instruct the control circuitry to generate the application displays and transmit the generated displays to the user equipment devices. The server application may instruct the control circuitry of the media data source 1518 to transmit data for storage on the user equipment. The client application may instruct control circuitry of the receiving user equipment to generate the media application displays.

Content and/or media data delivered to user equipment devices 1502, 1504, and 1506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include You-Tube, Netflix, and Hulu, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media data described above. In addition to content and/or media data, providers of OTT content can distribute media applications (e.g., web-based applications or cloud-based applications), or the content can be displayed by media applications stored on the user equipment device.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

What is claimed is:

1. A method for selectively activating subtitles, the method comprising:
storing, in a user profile associated with a client device, a language classification probability vector (LCPV) corresponding to the user profile, the LCPV comprising a plurality of discrete values each corresponding to a language or an accent, wherein the LCPV for the user profile is available in real time; and
wherein the LCPV is at least one of generated at a server and transmitted to the client device as metadata or determined by the client device;
generating for display a media asset via a user interface, wherein the media asset comprises a plurality of audio portions each corresponding to a subject of a plurality of subjects depicted in a scene of the media asset;
for a first subject of the plurality of subjects depicted in the scene:
identifying a first LCPV corresponding to the first subject, wherein the first LCPV is available in real time;
based at least in part on a comparison between the first LCPV corresponding to the first subject and the LCPV corresponding to the user profile, determining that the first LCPV corresponding to the first subject is beyond a threshold distance from the LCPV corresponding to the user profile;
based at least in part on determining that the first LCPV corresponding to the first subject is beyond the threshold distance from the LCPV corresponding to the user profile, activating first subtitles for an audio portion corresponding to the first subject; and
for a second subject of the plurality of subjects depicted in the scene:
identifying a second LCPV corresponding to the second subject, wherein the second LCPV is available in real time;
based at least in part on a comparison between the second LCPV corresponding to the second subject and the LCPV corresponding to the user profile, determining that the second LCPV corresponding to the second subject is below the threshold distance from the LCPV corresponding to the user profile; and
based at least in part on determining that the second LCPV corresponding to the second subject is below the threshold distance from the LCPV corresponding to the user profile, maintaining second subtitles for an audio portion corresponding to the second subject in an off state.

2. The method of claim 1, further comprising:
receiving a selected language corresponding to the user profile;
receiving a speech input corresponding to the user profile; and
modifying the LCPV corresponding to the user profile based on the selected language and the speech input.

3. The method of claim 1, wherein audio of the media asset comprises a media asset language profile represented by metadata associated with the media asset, the method further comprising:
comparing the LCPV corresponding to the user profile to the media asset language profile represented by the metadata associated with the media asset.

4. The method of claim 1, wherein the LCPV corresponding to the user profile indicates the user profile is associated with a proficiency in both a primary language and a secondary language, the method further comprising:

identifying in audio of the media asset a first section of dialogue associated with the primary language;

identifying in the audio of the media asset a second section of dialogue associated with the secondary language; and preventing activation of subtitles for the first section of dialogue and the second section of dialogue.

5. The method of claim 1, further comprising:

receiving an input to turn subtitles on or off for the media asset; and modifying the LCPV corresponding to the user profile based on the input.

6. The method of claim 1, further comprising:

presenting a list of subjects of the plurality of subjects corresponding to the media asset;

receiving a selection of a selected subject from the list of subjects; and activating subtitles for the media asset during portions of the media asset in which the selected subject speaks.

7. The method of claim 6, wherein the media asset is a first media asset comprising the selected subject, the method further comprising:

storing a reference to the selected subject in the user profile;

identifying a second media asset comprising the selected subject;

comparing an LCPV of a first language profile associated with the selected subject and the first media asset to an LCPV of a second language profile associated with the selected subject and the second media asset; and in response to determining that the LCPV of the first language profile and the LCPV of the second language profile are within the threshold distance, activating subtitles for the second media asset comprising the selected subject during portions of the second media asset in which the selected subject speaks.

8. The method of claim 1, further comprising:

presenting a list of subjects of the plurality of subjects corresponding to the media asset;

receiving a selection of a selected subject from the list of subjects; and replacing audio of the media asset corresponding to the selected subject with computer generated audio.

9. The method of claim 1, wherein the media asset is generated for display via a primary device, the method further comprising generating for display on a secondary device the first subtitles for the audio portion corresponding to the first subject.

10. A system for selectively activating subtitles, the system comprising:

control circuitry configured to:

store, in a user profile associated with a client device, a language classification probability vector (LCPV) corresponding to the user profile, the LCPV comprising a plurality of discrete values each corresponding to a language or accent, wherein the LCPV for the user profile is available in real time; and wherein the LCPV is at least one of generated at a server and transmitted to the client device as metadata or determined by the client device; and input/output circuitry configured to display a media asset via a user interface, wherein the media asset comprises a plurality of audio portions each corresponding to a subject of a plurality of subjects depicted in a scene of the media asset; and wherein the control circuitry is further configured to:

for a first subject of the plurality of subjects depicted in the scene:

identify a first LCPV corresponding to the first subject, wherein the first LCPV is available in real time;

based at least in part on a comparison between the first LCPV corresponding to the first subject and the LCPV corresponding to the user profile, determine that the first LCPV corresponding to the first subject is beyond a threshold distance from the LCPV corresponding to the user profile;

based at least in part on determining that the first LCPV corresponding to the first subject is beyond the threshold distance from the LCPV corresponding to the user profile, activate first subtitles for an audio portion corresponding to the first subject; and for a second subject of the plurality of subjects depicted in the scene:

identify a second LCPV corresponding to the second subject, wherein the second LCPV is available in real time;

based at least in part on a comparison between the second LCPV corresponding to the second subject and the LCPV corresponding to the user profile, determine that the second LCPV corresponding to the second subject is below the threshold distance from the LCPV corresponding to the user profile; and based at least in part on determining that the second LCPV corresponding to the second subject is below the threshold distance from the LCPV corresponding to the user profile, maintain second subtitles for an audio portion corresponding to the second subject in an off state.

11. The system of claim 10, wherein:

the input/output circuitry is further configured to:

receive a selected language corresponding to the user profile; and receive a speech input corresponding to the user profile; and the control circuitry is further configured to:

modify the LCPV corresponding to the user profile based on the selected language and the speech input.

12. The system of claim 10, wherein audio of the media asset comprises a media asset language profile represented by metadata associated with the media asset, and wherein the control circuitry is further configured to: compare the LCPV corresponding to the user profile to the media asset language profile represented by the metadata associated with the media asset.

13. The system of claim 10, wherein the LCPV corresponding to the user profile indicates the user profile is associated with a proficiency in both a primary language and a secondary language, wherein the control circuitry is further configured to:

identify in audio of the media asset a first section of dialogue associated with the primary language;

identify in the audio of the media asset a second section of dialogue associated with the secondary language; and prevent activation of subtitles for the first section of dialogue and the second section of dialogue.

14. The system of claim 10, wherein:

the input/output circuitry is further configured to receive an input to turn subtitles on or off for the media asset; and the control circuitry is further configured to modify the LCPV corresponding to the user profile based on the input.

15. The system of claim 10, wherein:

the input/output circuitry is further configured to:

present a list of subjects of the plurality of subjects corresponding to the media asset; and receive a selection of a selected subject from the list of subjects; and the control circuitry is further configured to activate subtitles for the media asset during portions of the media asset in which the selected subject speaks.

16. The system of claim 15, wherein the media asset is a first media asset comprising the selected subject, wherein the control circuitry is further configured to:

store a reference to the selected subject in the user profile;

identify a second media asset comprising the selected subject;

compare an LCPV of a first language profile associated with the selected subject and the first media asset to an LCPV of a second language profile associated with the selected subject and the second media asset; and in response to determining that the LCPV of the first language profile and the LCPV of the second language profile are within the threshold distance, activate subtitles for the second media asset comprising the selected subject during portions of the second media asset in which the selected subject speaks.

17. The system of claim 10, wherein:

the input/output circuitry is further configured to:

present a list of subjects of the plurality of subjects corresponding to the media asset; and receive a selection of a selected subject from the list of subjects; and the control circuitry is further configured to replace audio of the media asset corresponding to the selected subject with computer generated audio.

18. The system of claim 10, wherein the media asset is generated for display via a primary device, and wherein the input/output circuitry is further configured to generate for display on a secondary device the first subtitles for the audio portion corresponding to the first subject.

* * * * *